(12) United States Patent
Khalfi et al.

(10) Patent No.: US 12,309,704 B2
(45) Date of Patent: May 20, 2025

(54) PRE-EMPTIVE BUFFER STATUS REPORT EXTENSION FOR NETWORK POWER SAVING

(71) Applicant: QUALCOMM Incorporated, San Diego, CA (US)

(72) Inventors: Bassem Khalfi, San Diego, CA (US); Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/826,078

(22) Filed: May 26, 2022

(65) Prior Publication Data

US 2023/0388928 A1 Nov. 30, 2023

(51) Int. Cl.
*H04W 52/02* (2009.01)
*H04W 28/02* (2009.01)
*H04W 88/08* (2009.01)

(52) U.S. Cl.
CPC ... *H04W 52/0235* (2013.01); *H04W 28/0278* (2013.01); *H04W 52/0219* (2013.01); *H04W 52/028* (2013.01); *H04W 88/08* (2013.01)

(58) Field of Classification Search
CPC ......... H04W 52/0235; H04W 28/0278; H04W 52/028; H04W 88/08; H04W 52/0219;
(Continued)

(56) References Cited

U.S. PATENT DOCUMENTS

| 2010/0195557 | A1* | 8/2010 | Aoki | H04L 12/4035 370/312 |
| 2011/0292901 | A1* | 12/2011 | Pettersson | H04W 72/52 370/328 |

(Continued)

FOREIGN PATENT DOCUMENTS

| EP | 3863325 A2 | 8/2021 |
| WO | WO-2021255107 A1 | 12/2021 |

OTHER PUBLICATIONS

Wu et al, "A Low-Cost Low-Power LoRa Mesh Network for Large-Scale Environmental Sensing", IEEE 2023 (Year: 2023).*

(Continued)

*Primary Examiner* — Omer S Mian
(74) *Attorney, Agent, or Firm* — Holland & Hart LLP

(57) ABSTRACT

Methods, systems, and devices for wireless communications are described. A first device (e.g., an integrated access and backhaul (IAB) node) may obtain one or more messages from one or more second devices (e.g., user equipments (UEs), child nodes) communicating with the first device, the messages triggering the first device to generate a buffer status report (BSR). The first device may output the BSR in a BSR message to a parent device, where the BSR may indicate one or more arrival times associated with expected traffic for the second devices based on the messages. Upon obtaining the BSR message, the parent device may activate a sleep mode for one or more components associated with (Continued)

the parent device based on the arrival times indicated in the BSR. For example, if the arrival times are relatively long, the parent device may activate a sleep mode for increased power savings.

30 Claims, 19 Drawing Sheets

(58) Field of Classification Search
CPC .......... H04W 52/0229; H04W 52/0216; Y02D 30/50
See application file for complete search history.

(56) References Cited

U.S. PATENT DOCUMENTS

| | | | |
|---|---|---|---|
| 2016/0081109 A1* | 3/2016 | Li | H04W 72/569 370/329 |
| 2020/0154354 A1* | 5/2020 | Awoniyi-Oteri | H04W 74/0833 |
| 2021/0076404 A1 | 3/2021 | Tsai et al. | |
| 2022/0232607 A1 | 7/2022 | Fujishiro et al. | |
| 2023/0217304 A1* | 7/2023 | Singh | H04W 72/1263 370/329 |
| 2023/0262508 A1* | 8/2023 | Liu | H04W 28/0278 370/252 |
| 2023/0337136 A1 | 10/2023 | Abotabl et al. | |
| 2024/0015580 A1* | 1/2024 | Fujishiro | H04W 28/0278 |

OTHER PUBLICATIONS

Zhai et al "Mesh Architecture for Efficient Integrated Access and Backhaul Networking", IEEE, 2020 (Year: 2020).*
International Search Report and Written Opinion—PCT/US2023/067192—ISA/EPO—Nov. 3, 2023 (2202904WO).
3GPP TS 38.321, "3rd Generation Partnership Project; Technical Specification Group Radio Access Network; NR; Medium Access Control (MAC) Protocol Specification (Release 16)," 3GPP TS 38.321, V16.7.0, Dec. 2021, pp. 1-158.
Huawei: "New SI: Study on Network Energy Savings for NR," 3GPP Draft, 3GPP TSG RAN Meeting #94e, RP-213554 (revision of RP-212709), Electronic Meeting, Dec. 6-17, 2021, 16 Pages.
Partial International Search Report—PCT/US2023/067192—ISA/EPO—Sep. 12, 2023 (2202904WO).
Samsung: "Enhancements to LCG Space and BSR Triggering Including Pre-Emptive BSR", 3GPP TSG-RAN WG2 #115-e, R2-2107178, 3rd Generation Partnership Project, Mobile Competence Centre, 650, Route Des Lucioles, F-06921 Sophia-Antipolis Cedex, France, vol. RAN WG2, No. E-meeting, May 19, 2021-May 27, 2021, Aug. 5, 2021, 6 pages, XP052032260.

* cited by examiner

PRE-EMPTIVE BUFFER STATUS REPORT EXTENSION FOR NETWORK POWER SAVING

INTRODUCTION

The following relates to wireless communications, and more specifically to network power saving.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method is described. The method may include obtaining one or more messages from one or more second devices in communication with the first device, the one or more messages triggering generation of a first BSR by the first device and outputting a BSR message including the first BSR, the first BSR indicating one or more arrival times associated with expected traffic for the one or more second devices in communication with the first device based on the one or more messages.

An apparatus is described. The apparatus may include a processor, and memory coupled with the processor, the processor configured to obtain one or more messages from one or more second devices in communication with the first device, the one or more messages triggering generation of a first BSR by the first device and output a BSR message including the first BSR, the first BSR indicating one or more arrival times associated with expected traffic for the one or more second devices in communication with the first device based on the one or more messages.

Another apparatus is described. The apparatus may include means for obtaining one or more messages from one or more second devices in communication with the first device, the one or more messages triggering generation of a first BSR by the first device and means for outputting a BSR message including the first BSR, the first BSR indicating one or more arrival times associated with expected traffic for the one or more second devices in communication with the first device based on the one or more messages.

A non-transitory computer-readable medium storing code is described. The code may include instructions executable by a processor to obtain one or more messages from one or more second devices in communication with the first device, the one or more messages triggering generation of a first BSR by the first device and output a BSR message including the first BSR, the first BSR indicating one or more arrival times associated with expected traffic for the one or more second devices in communication with the first device based on the one or more messages.

Some examples of the method, apparatuses, and non-transitory computer-readable medium described herein may further include operations, features, means, or instructions for outputting the BSR message including the first BSR and a second BSR, where a first set of one or more bits of the BSR message may be used for the first BSR and a second set of one or more bits of the BSR message may be used for the second BSR, the second BSR indicating one or more arrival times associated with current traffic for the one or more second devices.

Some examples of the method, apparatuses, and non-transitory computer-readable medium described herein may further include operations, features, means, or instructions for obtaining the one or more messages from the one or more second devices, the one or more messages including one or more second BSRs triggering the generation of the first BSR by the first device.

Some examples of the method, apparatuses, and non-transitory computer-readable medium described herein may further include operations, features, means, or instructions for obtaining the one or more messages indicating a periodicity for generating the first BSR, where the BSR message may be output according to the periodicity.

Some examples of the method, apparatuses, and non-transitory computer-readable medium described herein may further include operations, features, means, or instructions for obtaining the one or more messages from a parent device of the first device, the one or more messages triggering the generation of the first BSR by the first device, where the one or more second devices includes the parent device.

Some examples of the method, apparatuses, and non-transitory computer-readable medium described herein may further include operations, features, means, or instructions for obtaining the one or more messages from the one or more second devices indicating that a sleep mode may have been activated for one or more components associated with the one or more second devices, the sleep mode triggering the generation of the first BSR by the first device.

Some examples of the method, apparatuses, and non-transitory computer-readable medium described herein may further include operations, features, means, or instructions for providing, for including within the first BSR, an indication of a first average arrival time associated with expected traffic for one or more second devices of a first type and a second average arrival time associated with the expected traffic for one or more second devices of a second type.

Some examples of the method, apparatuses, and non-transitory computer-readable medium described herein may further include operations, features, means, or instructions for providing, for including within the first BSR, an indication of an average arrival time associated with the expected traffic for the one or more second devices, where the one or more second devices may be of a first type or a second type.

Some examples of the method, apparatuses, and non-transitory computer-readable medium described herein may further include operations, features, means, or instructions for providing, for including within the first BSR, an indication of a minimum arrival time associated with the expected traffic for the one or more second devices.

Some examples of the method, apparatuses, and non-transitory computer-readable medium described herein may further include operations, features, means, or instructions for providing, for including within the first BSR, an indication of a priority associated with each of the one or more second devices.

Some examples of the method, apparatuses, and non-transitory computer-readable medium described herein may further include operations, features, means, or instructions for outputting the BSR message at a time determined based on the one or more arrival times.

A method for wireless communication at a first device in a wireless network is described. The method may include obtaining a BSR message including a first BSR from a second device, the first BSR indicating one or more arrival times associated with expected traffic for one or more third devices in communication with the second device and activating a sleep mode for one or more components associated with the first device based on the one or more arrival times indicated in the first BSR.

An apparatus for wireless communication at a first device in a wireless network is described. The apparatus may include a processor, and memory coupled with the processor, the processor configured to obtain a BSR message including a first BSR from a second device, the first BSR indicating one or more arrival times associated with expected traffic for one or more third devices in communication with the second device and activate a sleep mode for one or more components associated with the first device based on the one or more arrival times indicated in the first BSR.

Another apparatus for wireless communication at a first device in a wireless network is described. The apparatus may include means for obtaining a BSR message including a first BSR from a second device, the first BSR indicating one or more arrival times associated with expected traffic for one or more third devices in communication with the second device and means for activating a sleep mode for one or more components associated with the first device based on the one or more arrival times indicated in the first BSR.

A non-transitory computer-readable medium storing code for wireless communication at a first device in a wireless network is described. The code may include instructions executable by a processor to obtain a BSR message including a first BSR from a second device, the first BSR indicating one or more arrival times associated with expected traffic for one or more third devices in communication with the second device and activate a sleep mode for one or more components associated with the first device based on the one or more arrival times indicated in the first BSR.

Some examples of the method, apparatuses, and non-transitory computer-readable medium described herein may further include operations, features, means, or instructions for obtaining the BSR message including the first BSR and a second BSR, where a first set of one or more bits of the BSR message may be used for the first BSR and a second set of one or more bits of the BSR message may be used for the second BSR, the second BSR indicating one or more arrival times associated with current traffic for the one or more third devices.

Some examples of the method, apparatuses, and non-transitory computer-readable medium described herein may further include operations, features, means, or instructions for outputting one or more messages to the second device triggering generation of the first BSR by the second device.

Some examples of the method, apparatuses, and non-transitory computer-readable medium described herein may further include operations, features, means, or instructions for obtaining, within the first BSR, an indication of a first average arrival time associated with the expected traffic for one or more third devices of a first type and a second average arrival time associated with the expected traffic for one or more third devices of a second type.

Some examples of the method, apparatuses, and non-transitory computer-readable medium described herein may further include operations, features, means, or instructions for obtaining, within the first BSR, an indication of an average arrival time associated with the expected traffic for the one or more third devices, where the one or more third devices may be of a first type or a second type.

Some examples of the method, apparatuses, and non-transitory computer-readable medium described herein may further include operations, features, means, or instructions for obtaining, within the first BSR, an indication of a minimum arrival time associated with the expected traffic for the one or more third devices.

Some examples of the method, apparatuses, and non-transitory computer-readable medium described herein may further include operations, features, means, or instructions for obtaining, within the first BSR, an indication of a priority associated with each of the one or more third devices.

Some examples of the method, apparatuses, and non-transitory computer-readable medium described herein may further include operations, features, means, or instructions for activating the sleep mode for the one or more components associated with the first device based on obtaining the BSR message at a time determined based on the one or more arrival times.

DETAILED DESCRIPTION

Figure 1:
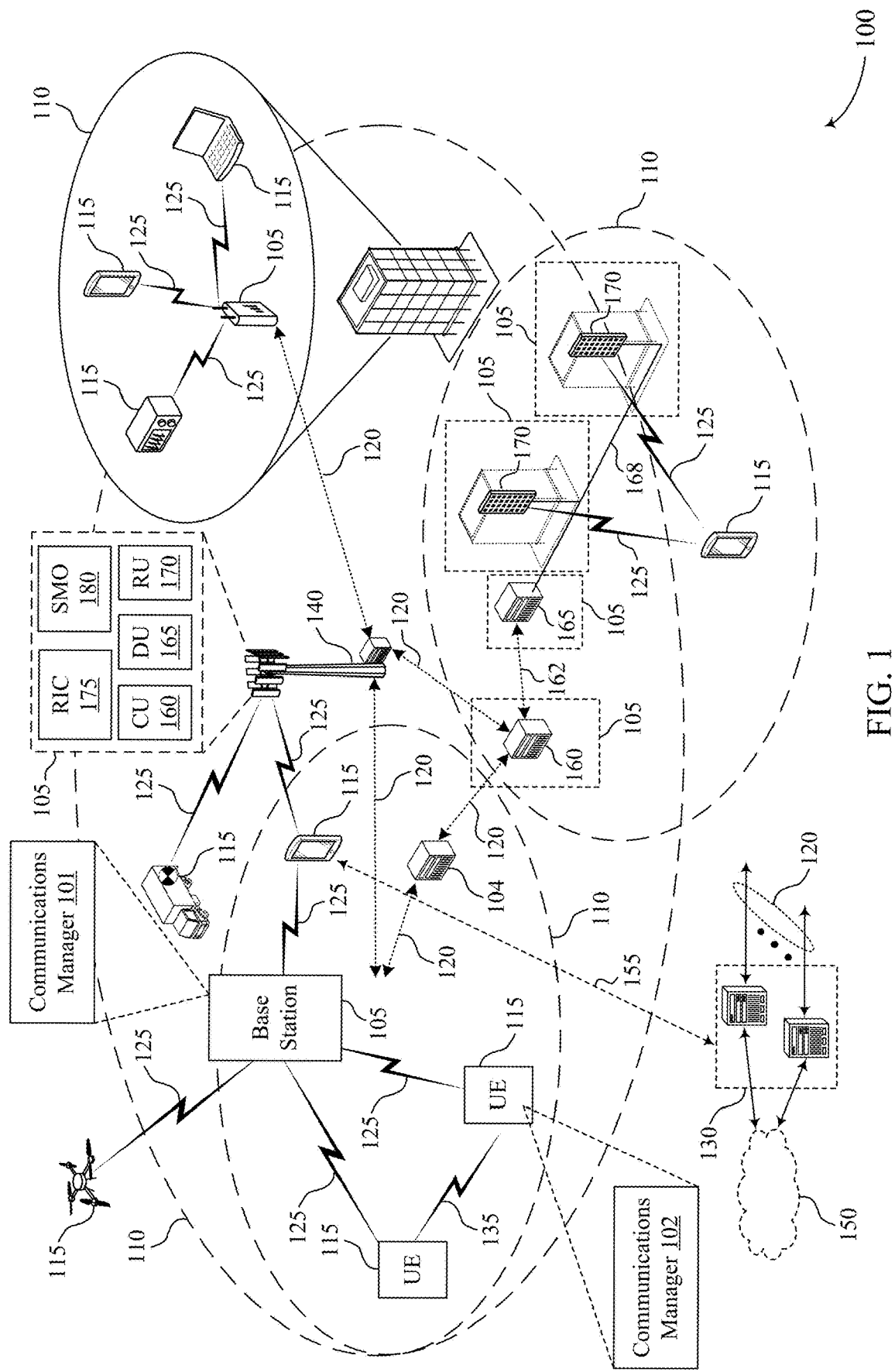
FIG. 1 illustrates an example of a wireless communications system that supports pre-emptive BSR extension for network power saving in accordance with one or more aspects of the present disclosure.

In some examples, a wireless device, which may also be referred to as an integrated access and backhaul (IAB) node, may assist a parent device (e.g., a parent IAB node) in communication with the wireless device with activation or deactivation of different sleep modes for one or more components or functionalities of the parent device to save power and maintain operations in a wireless communications system. The one or more components may include a central unit (CU), a radio unit (RU), a distributed unit (DU), a mobile termination (MT) antenna, and other physical components of the parent device, and the functionalities may include a transmit power, an operating or communication bandwidth, or the like. A sleep mode may be a period of time in which the parent device may deactivate or reduce functionality of one or components of the parent device. In some cases, the period of time may be based on transition times of a component (e.g., the time for activating or deactivating the one or more components or functionalities). The parent device may consume different amounts of power when activating or deactivating a component, and thus, the parent device may select a sleep mode to activate for one or more components based on how much power may be saved and the transition times for the one or more components.

In some examples, the parent device may enter a light sleep mode that corresponds to some power savings and a relatively short transition time between the light sleep mode and an active or awake mode (e.g., an operating mode in which all components of the parent device are activated and operative). During a light sleep mode the parent device may limit or deactivate at least some functionalities of one or more components of the parent device. Alternatively, the parent device may enter a deep sleep mode, which may correspond to higher power savings compared to the light sleep mode. In a deep sleep mode, the parent device may limit or deactivate more functionalities of the one or more components of the parent device than in a light sleep mode. For example, the parent device may completely deactivate an MT antenna in a deep sleep mode. According to one or more examples, the transition time between the deep sleep mode and the active or awake mode may be longer than the transition time for a light sleep mode. For example, the parent device may deactivate additional components or more complex components or functionalities for a deep sleep mode than for a light sleep mode. As such, the transition time may be longer for a deep sleep mode than a light sleep mode as the time for deactivating (or activating) components or functionality in the deep sleep mode may be longer than the time for deactivating (or activating) components in the light sleep mode.

In some examples, the parent device may enter or activate a given sleep mode to achieve increased power savings by being aware of traffic conditions or expected communications from one or more second devices (e.g., one or more UEs, one or more child IAB nodes) in communication with the wireless device (e.g., uplink transmissions), or expected communications between second devices (e.g., sidelink transmissions between UEs). As described herein, traffic may refer to a quantity of uplink transmissions communicated from one or more second devices (e.g., UEs, child IAB nodes, or both) to the wireless device or a quantity of sidelink transmissions communicated between two or more UEs.

However, if the parent device of the wireless device (e.g., the parent IAB node) is unaware of the traffic conditions of the second devices in communication with to the wireless device (e.g., the UEs and the child IAB nodes in communication with the wireless device), the parent device may inefficiently activate a sleep mode, resulting in increased power consumption or failed transmissions. For example, the parent device may activate an inefficient sleep mode by activating a light sleep mode where a deep sleep mode may save more power. Alternatively, the parent device may activate an inefficient sleep mode by activating a given sleep mode at a later time than if the parent device had information related to traffic conditions at one or more second devices. For example, the parent device may save more power in a deep sleep mode than a light sleep mode, however the parent device may use a longer transition time to enter the deep sleep mode during which the parent device may be unable to perform communications (or other functions) with one or more wireless devices.

Additionally, or alternatively, if the parent device enters the deep sleep mode without knowledge of the traffic loads of the second devices (e.g., UEs, child IAB nodes, or both) communicating with the wireless device, the parent device may miss or lose transmissions from the wireless device. In some cases, the parent device may activate a light sleep mode in scenarios during which the parent device based on receiving few transmissions from one or more second devices (e.g., light traffic conditions corresponding to an amount of traffic below a threshold). However, because of the light traffic conditions, the parent device may have saved additional power had the parent device activated a deep sleep mode. As such, knowing the traffic conditions of the second devices in communication with the wireless device may assist the parent device in determining to enter deeper sleep modes for increased power savings.

As described herein, a wireless device (e.g., an IAB node) may output an extended, pre-emptive BSR to a parent device (e.g., a parent IAB node), where the extended, pre-emptive BSR may assist the parent device in activating a sleep mode for one or more of its components (e.g., an MT antenna, a CU, a DU, an RU). In some examples, the wireless device may obtain one or more messages from one or more second devices in communication with the wireless device (e.g., UEs, child IAB nodes), the parent device, or a combination thereof. The one or more messages may trigger the wireless device to generate a BSR (e.g., an extended, pre-emptive BSR) to be output to the parent device. For example, the one or more messages may include a BSR from a second device, or the one or more messages may include a trigger from the parent device which may be a message indicating that the wireless device is to generate the BSR, among other examples.

The wireless device may generate the BSR, which may indicate arrival times associated with expected traffic (e.g., uplink communications) to be transmitted from the one or more second devices to the wireless device. For example, the BSR may indicate particular times (e.g., a minimum time, an average time) at which some data is to be received at the wireless device from one or more second devices. The parent device may obtain a BSR message including the generated BSR from the wireless device. Based on the arrival times indicated in the BSR, the parent device may activate a sleep mode for one or more components of the parent device (e.g., an MT antenna, a CU, a DU, an RU). For example, if the arrival times are relatively long, indicating sparse traffic conditions, the parent device may enter a deep sleep mode and turn off functionalities of some components, which may increase power savings. In addition, activating a sleep mode based on the arrival times may prevent dropped communications and increase the efficiency of transition times between sleep modes and the active or awake modes for the components of the parent device.

Aspects of the disclosure are initially described in the context of wireless communications systems. Aspects of the disclosure are then described in the context of network architectures and process flows. Aspects of the disclosure are further illustrated by and described with reference to apparatus diagrams, system diagrams, and flowcharts that relate to pre-emptive BSR extension for network power saving.

FIG. 1 illustrates an example of a wireless communications system 100 that supports pre-emptive BSR extension for network power saving in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node, which may be referred to as a node, a network node, a network entity, or a wireless node, may be a network entity 105 (e.g., any network entity 105 described herein), a UE 115 (e.g., any UE 115 described herein), a network controller, an apparatus, a device, a computing system, one or more components, and/or another suitable processing entity configured to perform any of the techniques described herein. For example, a network node may be a UE 115. As another example, a network node may be a network entity 105. As another example, a first network node may be configured to communicate with a second network node or a third network node. In one aspect of this example, the first network node may be a UE 115, the second network node may be a network entity 105, and the third network node may be a UE 115. In another aspect of this example, the first network node may be a UE 115, the second network node may be a network entity 105, and the third network node may be a network entity 105. In yet other aspects of this example, the first, second, and third network nodes may be different relative to these examples. Similarly, reference to a UE 115, network entity 105, apparatus, device, computing system, or the like may include disclosure of the UE 115, network entity 105, apparatus, device, computing system, or the like being a network node. For example, disclosure that a UE 115 is configured to receive information from a network entity 105 also discloses that a first node is configured to receive information from a second node. For example, disclosure that a UE 115 is configured to receive information from a network entity 105 also discloses that a first network node is configured to receive information from a second network node. Consistent with this disclosure, once a specific example is broadened in accordance with this disclosure (e.g., a UE 115 is configured to receive information from a network entity 105 also discloses that a first network node is configured to receive information from a second network node), the broader example of the narrower example may be interpreted in the reverse, but in a broad open-ended way. In the example above where a UE 115 being configured to receive information from a network entity also discloses that a first network node being configured to receive information from a second network node, the first network node may refer to a first UE 115, a first network entity 105, a first apparatus, a first device, a first computing system, a first one or more components, a first processing entity, or the like configured to receive the information; and the second network node may refer to a second UE 115, a second network entity 105, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an IAB network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a CU 160, a DU 165, an RU 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB-MT controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support pre-emptive BSR extension for network power saving as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the EHF band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

A network entity 105 or a UE 115 may be equipped with multiple antennas, which may be used to employ techniques such as transmit diversity, receive diversity, multiple-input multiple-output (MIMO) communications, or beamforming. The antennas of a base station 140 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105, a base station 140, or both may have an antenna array with a number of rows and columns of antenna ports that the network entity 105, the base station 140, or both may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Some wireless communications systems 100 may include wireless devices, such as IAB nodes 104 and network entities 105, which support power savings, for example in 5G wireless communications and massive MIMO systems (e.g., green networks). In some examples, a wireless device may utilize different sleep modes (e.g., a light sleep mode, a deep sleep mode) and operations to save power and maintain network operations. For example, the wireless device may turn off or reduce some capabilities or components while in a particular sleep mode to save power. As such, the wireless device may enter a different sleep mode depending on what capabilities the wireless device turns off. In some cases, the wireless device may enter a sleep mode such as a micro-sleep mode, a light sleep mode, a deep sleep mode, or a full sleep mode, where the closer a particular sleep mode is to the full sleep mode, the lower the power consumption of the wireless device.

In some examples, sleep modes may differ in terms of operation. For example, in some sleep modes, the wireless device may turn off radio frequency chains. Further, different sleep modes may result in different power consumption and different transition times for the wireless device to transition from a particular power consumption (e.g., an active or awake mode in a legacy operation) to a particular sleep mode. For example, in a light sleep mode, an IAB node 104 or a network entity 105 may turn off some antennas and other features at an RU 170 such that the consumption power of the corresponding IAB node 104 or network entity 105 may transition into and out of the light sleep mode with respect to an active or awake mode over a relatively short transition time. In a deep sleep mode, the IAB node 104 or the network entity 105 may turn off more capabilities as compared to a lighter sleep mode, and as such, the corresponding wireless device may save relatively more power but may use a longer transition time to transition into and out of the deep sleep mode with respect to the active or awake mode.

Whether a wireless device enters a lighter or deeper sleep mode may depend on traffic associated with one or more second wireless devices (e.g., child IAB nodes, UEs 115) communicating with or supported by a wireless device. Traffic may include a quantity of uplink transmissions scheduled for transmission to the wireless device. For example, if an IAB node 104 is communicating with multiple UEs 115 and child IAB nodes with heavy traffic loads (e.g., a quantity of uplink transmissions above a threshold traffic amount), then a parent IAB node (e.g., a parent device) communicating with the IAB node 104 may refrain from activating any sleep mode for one or more of its components. In some other examples, if the IAB node 104 is communicating with a small quantity of UEs 115 and child IAB node with light traffic loads (e.g., a quantity of uplink transmissions below a threshold traffic amount), then the parent IAB node communicating with the IAB node 104 may enter a light sleep mode. If the IAB node 104 does not have communications scheduled or expected with any UEs 115 or child IAB nodes, then the parent IAB node may enter a deep sleep mode or a full sleep mode (e.g., one or more components of the parent IAB node may be turned off completely). As such, a wireless device may enter a given sleep mode based on a quantity of UEs 115, child IAB nodes, or both communicating with the wireless device, or the traffic or network load (e.g., amount of uplink communications) corresponding to the UEs 115, the child IAB nodes, or both (e.g., the UEs 115 may have higher traffic loads in the middle of the day than at midnight), among other factors.

The wireless communications system 100 may support an extended, pre-emptive BSR which may assist an IAB parent node (e.g., a parent device) in activating a sleep mode for one or more of its components. In some examples, an IAB node 104, a network entity 105, or a base station 140 may include a communications manager 101 configured to obtain one or more messages from one or more child IAB nodes, one or more UEs, or an parent IAB node in communications with the IAB node 104. The one or more messages may trigger the IAB node 104 to generate a BSR (e.g., an extended, pre-emptive BSR) for outputting to the parent IAB node. For example, the one or more messages may include a BSR from a child IAB node or a UE 115, or the one or more messages may include a trigger from the parent IAB node, among other examples.

The IAB node 104 may generate the BSR, which may indicate arrival times associated with expected traffic (e.g., uplink communications) to be transmitted from one or more child IAB nodes, UEs 115, or both, to the IAB node 104. For example, the BSR may indicate particular times (e.g., a minimum time, an average time) at which some transmissions are to be received at the IAB node 104 from one or more child IAB nodes, UEs 115, or both. The parent IAB node may include a communications manager 102 configured to obtain a BSR message including the generated BSR from the IAB node 104. Based on the arrival times indicated in the BSR, the parent IAB node may activate a sleep mode for one or more components of the parent IAB node (e.g., a CU 160, a DU 165, an RU 170). For example, if the arrival times are relatively long, indicating sparse traffic conditions, the parent IAB node may enter a deep sleep mode and turn off functionalities of some components, which may increase power savings. In addition, activating a sleep mode based on the arrival times may prevent dropped communications and increase the efficiency of transition times between sleep modes and the active or awake modes for the components of the parent IAB node.

Figure 2:
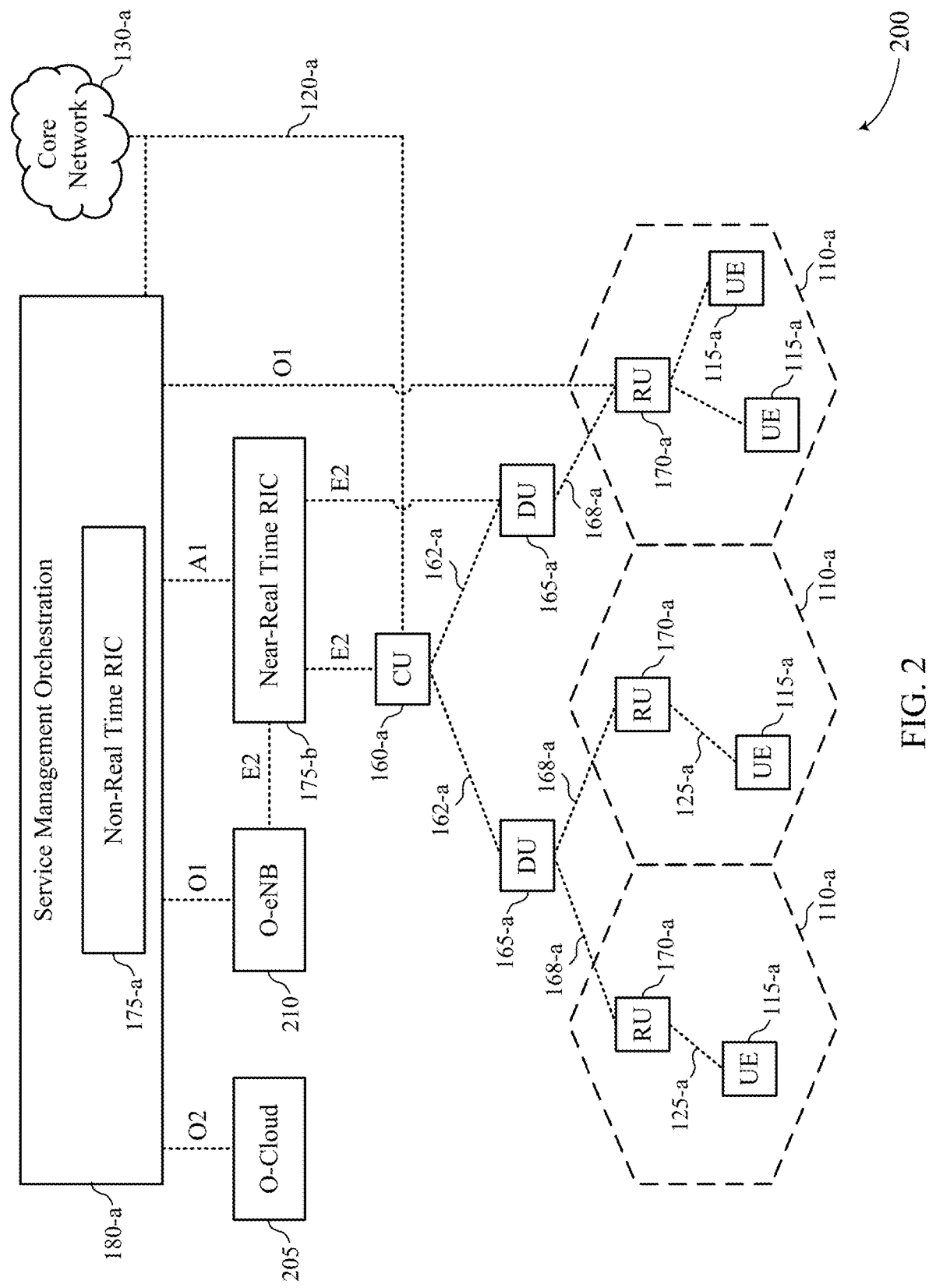
FIG. 2 illustrates an example of a network architecture that supports pre-emptive BSR extension for network power saving in accordance with one or more aspects of the present disclosure.

FIG. 2 illustrates an example of a network architecture 200 that (e.g., a disaggregated base station architecture, a disaggregated RAN architecture) that supports pre-emptive BSR extension for network power saving in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled with or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The network architecture 200 supports techniques for a wireless device (e.g., an IAB node) to transmit a BSR (e.g., an extended, pre-emptive BSR) to a parent device (e.g., a parent IAB node) to assist the parent device in activating a sleep mode for one or more of its components. In some examples, a component of the wireless device (e.g., an RU 170-*a*) may obtain one or more messages from one or more second devices (e.g., child IAB nodes, one or more UEs 115-*a*, or the parent device) in communications with the device. The one or more messages may trigger the wireless device to generate a BSR for outputting to the parent device. For example, the one or more messages may include a BSR from a child IAB node or a UE 115-*a*, or the one or more messages may include a trigger from the parent device, among other examples.

A component of the wireless device (e.g., a DU 165) may generate the BSR, which may indicate arrival times associated with expected traffic (e.g., uplink communications) to be transmitted from one or second devices to the wireless device. For example, the BSR may indicate particular times (e.g., a minimum time, an average time) at which some uplink transmissions are to be received at the wireless device from one or more child IAB nodes, UEs 115-a, or both. The parent device may obtain a BSR message including the generated BSR from the wireless device. Based on the arrival times indicated in the BSR, the parent device may activate a sleep mode for one or more of its components, such as a CU 160-a, a DU 165-a, an RU 170-a, an MT antenna, or any other components of the parent device. For example, if the arrival times are relatively long, indicating sparse traffic conditions, the parent device may activate a deep sleep mode and turn off functionalities of a DU 165-a, which may increase power savings. In addition, activating a sleep mode based on the arrival times may prevent dropped communications and increase the efficiency of transition times between sleep modes and the active or awake modes for the components of the parent device.

Figure 3:
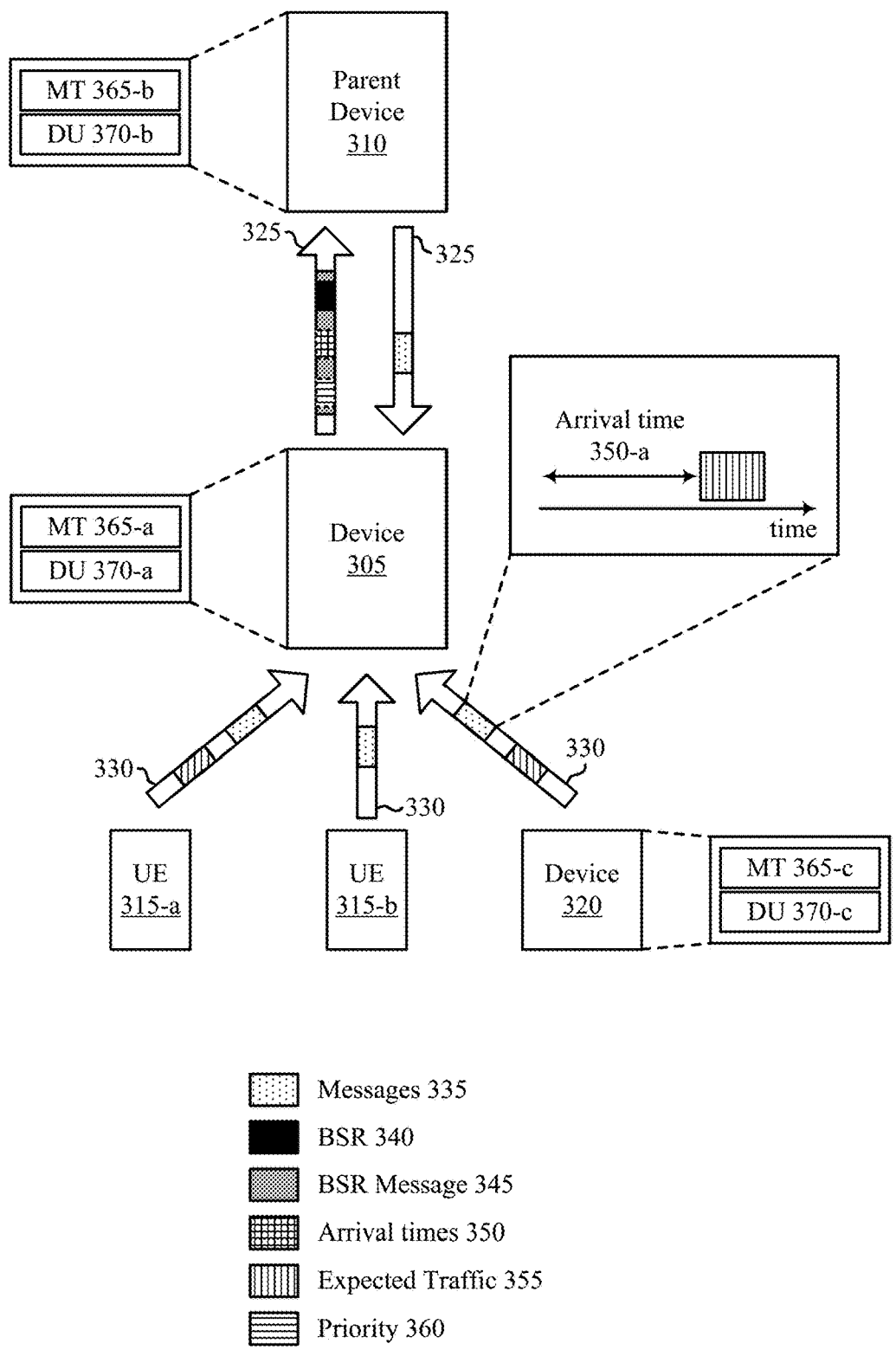
FIG. 3 illustrates an example of a wireless communications system that supports pre-emptive BSR extension for network power saving in accordance with one or more aspects of the present disclosure.

FIG. 3 illustrates an example of a wireless communications system 300 that supports pre-emptive BSR extension for network power saving in accordance with one or more aspects of the present disclosure. In some examples, the wireless communications system 300 may implement aspects of the wireless communications system 100 and the network architecture 200 or may be implemented by aspects of the wireless communications system 100 and the network architecture 200. For example, the wireless communications system 300 may include a device 305 and a parent device 310, which may be examples of IAB nodes and parent IAB nodes, respectively, as described herein. In addition, the wireless communications system 300 may include a UE 315-a, a UE 315-b, and a device 320 (e.g., a child IAB node) in communication with the device 305, which may be examples of corresponding devices as described herein. The device 305, the parent device 310, and the device 320 may each include an MT antenna 365, a DU 370, CU, RU, or other components in a disaggregated RAN architecture, where the components may be co-located or located in distributed locations (e.g., separate physical locations). For example, the device 305 may include an MT antenna 365-a and a DU 370-a, the parent device 310 may include an MT antenna 365-b and a DU 370-b, and the device 320 may include an MT antenna 365-c and a DU 370-c, where the device 320 may communicate with the device 305, and the device 305 may communicate with the parent device 310, via respective MT antennas 365.

The device 305 (e.g., a first device) may communicate with the parent device 310 over respective communication links 325, which may be examples of a backhaul communication link 120 as described with reference to FIG. 1. In addition, the device 305 may communicate with the UE 315-a, the UE 315-b, and the device 320, which may be a child IAB node, (e.g., one or more second devices) via respective communication links 330, which may be examples of a communication link 125 as described with reference to FIG. 1. The UE 315-a and the UE 315-b may be devices of a first type (e.g., UEs 315), and the device 320 may be a device of a second type (e.g., a child IAB node) different from the first type. In some examples, the device 305 may communicate with the device 320 by communicating signaling between the MT antenna 365-a and the MT antenna 365-c. In addition, the device 305 may communicate signaling with the UEs 315 via the MT antenna 365-a. In some cases, the device 305 may communicate with the parent device 310 by communicating signaling between the MT antenna 365-a and the MT antenna 365-b. The device 305 may include a the DU 370-b and other components used for communications with the parent device 310, the UEs 315, and the device 320.

To increase power savings in the wireless communications system 300, the device 305 may utilize pre-emptive BSR extension to assist the parent device 310 in activating a sleep mode for one or more components (e.g., the MT antenna 365-b, the DU 370-b) of the parent device 310 based on traffic conditions of the UEs 315 and the device 320. That is, the device 305 may transmit an extended, pre-emptive BSR to the parent device 310, where the extended, pre-emptive BSR may include information about an amount of traffic (e.g., a quantity of uplink transmissions) expected to arrive at the device 305 from a UE 315, the device 320, or any combination thereof.

In some cases, the device 305 may obtain one or more messages 335 from the UE 315-a, the UE 315-b, the device 320, or any other UE 315 or child device in communication with the device 305. The messages 335 may trigger the device 305 to generate a first BSR 340 (e.g., an extended, pre-emptive BSR). In some cases, a message 335 may include an additional BSR or an extended BSR reported from a UE 315 or the device 320. For example, a UE 315 or the device 320 may transmit an additional BSR to the device 305 indicating current traffic conditions associated with the transmitting device, or an extended BSR indicating future traffic conditions associated with the transmitting device, where the additional BSR or the extended BSR may trigger the device 305 to generate the first BSR 340.

Alternatively, the one or more messages 335 transmitted from the UEs 315, the device 320, or any combination thereof may indicate that a sleep mode has been activated for one or more components associated with the UEs 315, the device 320, or any combination thereof, which may trigger the device 305 to generate the first BSR 340. For example, the UE 315-a may transmit one or more messages 335 to the device 305 indicating that the UE 315-a may not expect any traffic for the next hour. In addition, the UE 315-b and the device 320 may transmit one or more messages 335 to the device 305 indicating that the UE 315-b and the device 320 may not expect any traffic for the next hour. Based on receiving the messages 335 from the UE 315-a, the UE 315-b and the device 320, the device 305 may generate the first BSR 340, which may trigger the parent device 310 to activate a sleep mode for one or more of its components for the next hour until the arrival of expected traffic 355 from the UEs 315 and the device 320 at the device 305.

In some cases, the one or more messages 335 may include an RRC configuration indicating a periodicity for generating the first BSR 340. As such, the device 305 may generate the first BSR 340 according to the periodicity. Additionally, or alternatively, the device 305 may receive one or more messages 335 from the parent device 310 via a communication link 325, the one or more messages 335 triggering the device 305 to generate the first BSR 340.

Upon receiving the one or more messages 335, the device 305 may generate the first BSR 340, where the first BSR 340 may indicate one or more arrival times 350 associated with expected traffic 355 from the UE 315-a, the UE 315-b, the device 320, or any combination thereof based on the messages 335. An arrival time 350 may be a time at which traffic 355 transmitted by the UE 315-a, the UE 315-b, or the device 320 is received at the device 305 (e.g., at the MT antenna 365-b). As the device 305 may be connected to multiple UEs 315 and devices 320 (e.g., child IAB nodes), a respective arrival time 350 of expected traffic 355 may be different for each UE 315 and the device 320. For example, expected traffic 355 associated with the device 320 may have an arrival time 350-a, which may be later than or earlier than arrival times 350 of expected traffic 355 associated with the UE 315-a and the UE 315-b. Additional information about arrival times 350 of the expected traffic 355 from the UE 315-a, the UE 315-b, and the device 320 is described with reference to FIG. 4A.

In some examples, the device 305 may include an indication an arrival time 350 of the expected traffic 355 corresponding to the UE 315-a, the UE 315-b, the device 320, or a combination thereof (e.g., each UE 315, child IAB node, or connected nodes connected to the device 305) in the first BSR 340. The expected traffic 355 may include uplink communications from the UE 315-a, the UE 315-b, the device 320, or any combination thereof to the device 305, sidelink communications between the UEs 315, or both. In some examples, the device 305 may include a separate indication of arrival times 350 in the first BSR 340 corresponding to each individual UE 315 or device 320. Alternatively, the indication of the arrival times 350 in the first BSR 340 may include an indication of an average arrival time 350 of expected traffic 355 for devices of a particular type. For example, the device 305 may include a first indication of an average arrival time 350 of the expected traffic 355 for the UEs 315 (e.g., devices of a first type, UEs 315), and a second indication of an average arrival time 350 of the expected traffic 355 for the device 320 and any other connected child IAB nodes (e.g., devices of a second type, child IAB nodes). In some examples, the average arrival time 350 may differ for each type of device.

In some cases, the device 305 may include an indication of an average arrival time 350 of expected traffic 355 associated with all of the devices of the first type and the second type (e.g., all UEs 315 and devices 320 communicating with the device 305, all connected nodes of the device 305). For example, the device 305 may include a single indication of the average arrival time 350 of the expected traffic 355 associated with the UE 315-a, the UE 315-b, the device 320, and any other UEs 315 or child IAB nodes connected to the device 305. Alternatively, the device 305 may include an indication of a minimum arrival time 350 of expected traffic 355 associated with all of the devices of the first type or the second type. For example, the UE 315-a may be associated with expected traffic 355 having a shortest arrival time 350 (e.g., the expected traffic 355 from the UE 315-a may arrive at the device 305 first), the device 320 may be associated with expected traffic 355 having a longer arrival time 350 than that of the UE 315-a, and the UE 315-b may be associated with expected traffic 355 having the longest arrival time 350 (e.g., the expected traffic 355 from the UE 315-b may arrive at the device 305 last).

By reporting the minimum arrival time 350 associated with the UE 315-a, the device 305 may ensure that the parent device 310 refrains from activating a sleep mode for one or more of its components until the expected traffic 355 from the UE 315-a has been received at the device 305, which may subsequently reduce the power savings of the device 305 in favor of having successful communications with the UE 315-a and reducing traffic latency from the UE 315-a. Alternatively, if the average arrival time 350 associated with expected traffic 355 from the UE 315-a, the UE 315-b, and the device 320 is indicated in the first BSR 340-a, which may be a later arrival time 350 than that of the UE 315-a, the parent device 310 may enter a sleep mode until a time after the arrival time 350 associated with expected traffic 355 from the UE 315-a. As such, the parent device 310 may increase power savings by activating a longer (and in some cases, deeper) sleep mode for one or more components of the parent device 310, while dropping the expected traffic 355 associated with the UE 315-a.

In addition, the device 305 may indicate the BSR first 340 in a BSR message 345. In addition, the BSR message 345 may include a priority 360 of each of the UEs 315 and the device 320, which may assist the parent device 310 in prioritizing communications with the device 305 or activating a sleep mode for one or more of its components. For example, if the UE 315-a is associated with the shortest arrival time 350 as described herein, and if the UE 315-a has a relatively low priority as indicated in the BSR message 345, the parent device 310 may activate a sleep mode for the time prior to the arrival time 350 associated with the UE 315-a, determining that the expected traffic 355 associated with the UE 315-a may be delayed.

The device 305 may output the BSR message 345 including the first BSR 340 to the parent device 310, where the first BSR 340 may indicate the one or more arrival times 350 associated with the expected traffic 355 for the UE 315-a, the UE 315-b, the device 320, or any combination thereof. The device 305 may output the BSR message 345 after generating the first BSR 340 based on the one or more messages 335. For example, the device 305 may output the BSR message 345 according to a periodicity (e.g., indicated in an RRC configuration in the one or more messages 335). In some examples, the BSR message 345 may be a standalone report that indicates the first BSR 340. Alternatively, the BSR message 345 may include the multiple BSRs, including the first BSR 340 and a second BSR which may be a pre-emptive BSR that carries different information. For example, a first set of one or more bits of the BSR message 345 may be used for the first BSR 340 and a second set of one or more bits of the BSR message 345 may be used for the second BSR, where the second BSR may indicate one or more arrival times 350 associated with current traffic for the UEs 315, the device 320, or any other child devices of the device 305. Additional information about the second BSR and other types of BSRs is described with reference to FIG. 4B. Alternatively, the device 305 may output the BSR message 345 at a time determined based on the one or more arrival times 350 indicated in the first BSR 340. That is, the device 305 may output the BSR message 345 such that the parent device 310 may activate or refrain from activating a sleep mode for one or more of its components to increase power savings or prioritize communications from the UEs 315 or the device 320.

In some examples, the parent device 310 may activate a sleep mode for one or more components associated with the first device based on the one or more arrival times 350 indicated in the first BSR 340 in the BSR message 345. For example, if the first BSR 340 indicates arrival times 350 which are relatively long (e.g., indicating that expected traffic 355 associated with the UEs 315 or the device 320 may arrive at a later time), the parent device 310 may activate a sleep mode (e.g., a light sleep mode, a deep sleep mode) for one or more components until the expected traffic 355 from the UEs 315 or the device 320 arrives at the device 305. In some examples, the parent device 310 may activate a sleep mode for different components of the parent device 310, such as the MT antenna 365-b, the DU 370-b, or another component based on the information included in the first BSR 340.

Figure 4A:
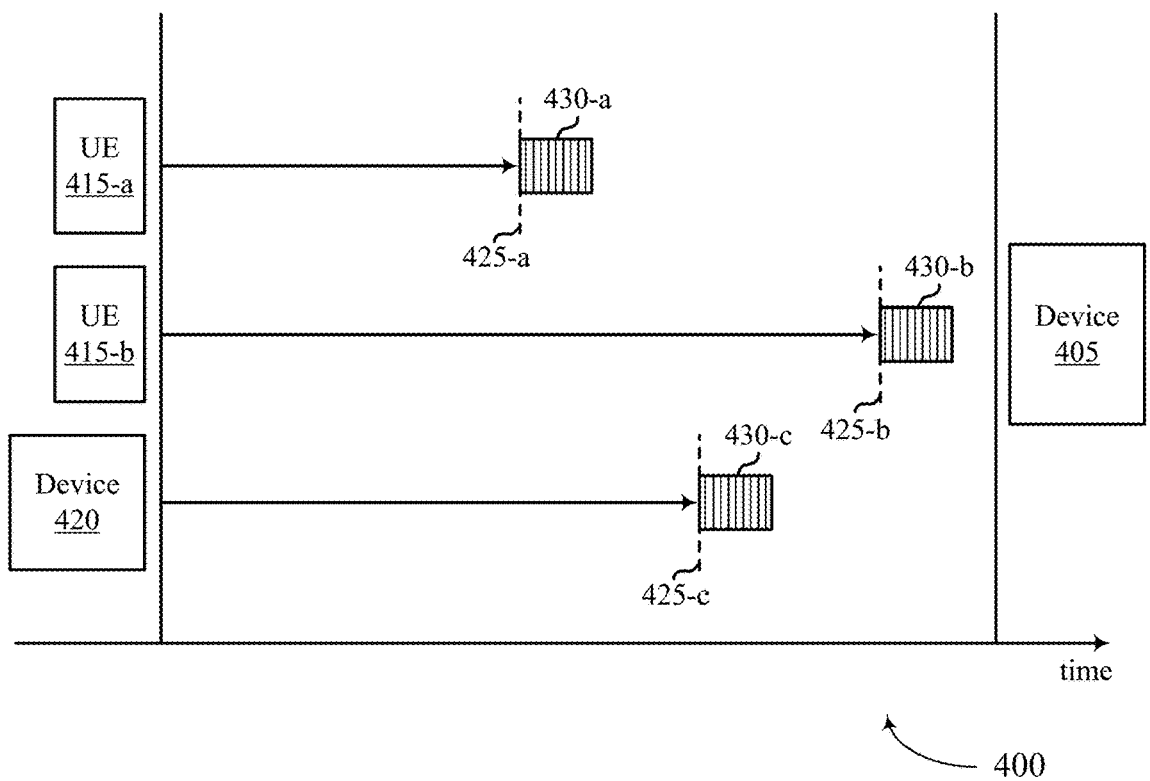
FIG. 4A illustrates an example of a timeline that supports pre-emptive BSR extension for network power saving in accordance with one or more aspects of the present disclosure.

FIG. 4A illustrates an example of a timeline 400 that supports pre-emptive BSR extension for network power saving in accordance with one or more aspects of the present disclosure. In some examples, the timeline 400 may implement aspects of the wireless communications system 100 and the network architecture 200 or may be implemented by aspects of the wireless communications system 100 and the network architecture 200. For example, the timeline 400 may be used by a device 405, which may be an example of an IAB node as described herein. In addition, the timeline 400 may be used by a UE 415-*a*, a UE 415-*b*, and a device 420 (e.g., a child IAB node) in communication with the device 405, which may be examples of corresponding devices as described herein. The device 405 and the device 420 may each include an MT antenna, a DU, a CU, an RU, or other components in a disaggregated RAN architecture, where the components may be co-located or located in distributed locations (e.g., separate physical locations).

As described herein with reference to FIG. 3, the device 405 may receive one or more messages from the UE 415-*a*, the UE 415-*b*, the device 420, or a combination thereof. The messages may trigger the device 405 to generate a BSR (e.g., an extended, pre-emptive BSR) for transmission to a parent device (e.g., a parent IAB node). The BSR may indicate one or more arrival times 425 associated with expected traffic 430 from the UE 415-*a*, the UE 415-*b*, the device 420, or any combination thereof, based on the information included in the messages.

An arrival time 425 may be a time at which expected traffic 430 (e.g., future uplink transmissions) transmitted by the UE 415-*a*, the UE 415-*b*, and the device 420 is to be received at the device 405 (e.g., an MT antenna of the device 405). In some examples, the arrival time 425 may be different for the expected traffic 430 transmitted from each device in communication with the device 405. For example, expected traffic 430-*a* transmitted from the UE 415-*a* may be received at (e.g., arrive at) the device 405 at an arrival time 425-*a*, which may be a latest arrival time. That is, the expected traffic 430-*a* may arrive at the device 405 before expected traffic 430-*b* transmitted from the UE 415-*b* and expected traffic 430-*c* transmitted from the device 420.

In addition, the expected traffic 430-*b* transmitted at from the UE 415-*b* may be received at the device 405 at an arrival time 425-*b*, which may be a latest arrival time. That is, the expected traffic 430-*b* may arrive at the device 405 after the expected traffic 430-*a* and the expected traffic 430-*c*. In addition, the expected traffic 430-*c* transmitted from the device 420 may be received at the device 405 at an arrival time 425-*c* between the arrival time 425-*a* and the arrival time 425-*c*. As such, the device 405 may receive the expected traffic 430-*a*, followed by the expected traffic 430-*c*, followed by the expected traffic 430-*b*. The device 405 may transmit the BSR to the parent device indicating the arrival time 425 of the expected traffic 430 for each of the UE 415-*a*, the UE 415-*b*, and the device 420. Based on the information in the BSR, the parent device may activate a sleep mode for one or more of its components (e.g., an MT antenna, a DU, an RU), for example, by turning off or reducing functionalities of the one or more components. For example, based on the arrival times 425, the parent device may activate a light sleep mode until the arrival time 425-*a* as there is no expected traffic 430 to be transmitted to the device 405 before the arrival time 425-*a*. As such, the parent device may save power before the device 405 receives the expected traffic 430-*a*.

Figure 4B:
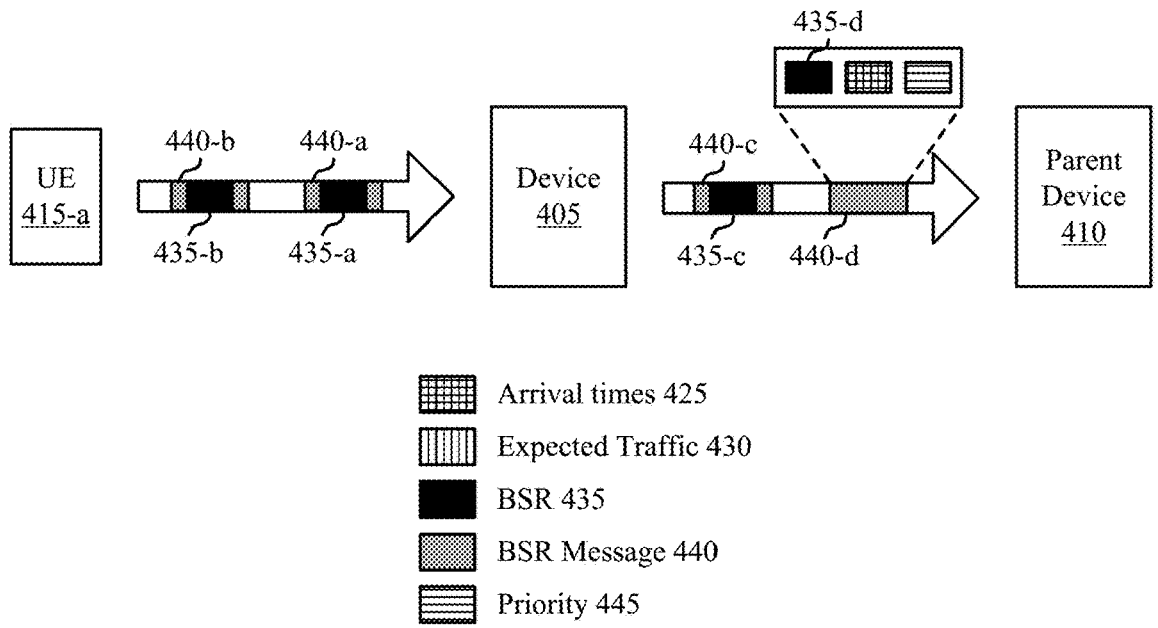
FIG. 4B illustrates an example of a wireless communications system that supports pre-emptive BSR extension for network power saving in accordance with one or more aspects of the present disclosure.

FIG. 4B illustrates an example of a wireless communication system 401 that supports pre-emptive BSR extension for network power saving in accordance with one or more aspects of the present disclosure. In some examples, the wireless communication system 401 may implement aspects of the wireless communications system 100 and the network architecture 200 or may be implemented by aspects of the wireless communications system 100 and the network architecture 200. For example, the wireless communication system 401 may include a device 405, which may be an example of an IAB node as described herein. In addition, the wireless communication system 401 may include a parent device 410 in communication with the device 405, which may be an example of a parent IAB node as described herein. The device 405 and the parent device 410 may each include an MT antenna, a DU, a CU, an RU, or other components in a disaggregated RAN architecture, where the components may be co-located or located in distributed locations (e.g., separate physical locations).

In some examples, the device 405 or the parent device 410 may active a sleep mode for one or more respective components based on a given type of BSR. For example, the device 405 may receive a BSR 435-*a* in a BSR message 440-*a* from the UE 415-*a*, which may trigger the device 405 to activate a sleep mode for one or more of its components. In some examples, the device 405 may receive a BSR 435-*b* in a BSR message 440-*b* from the UE 415-*a*. The BSR 435-*b* may be an extended BSR that triggers the device 405 to activate a sleep mode for one or more of its components. Alternatively, the parent device 410 may receive a BSR 435-*c* in a BSR message 440-*c* from the device 405. The BSR 435-*c* may be a pre-emptive BSR that triggers the parent device 410 to activate a sleep mode for one or more of its components. In some cases, the parent device 410 may receive a BSR 435-*d* in a BSR message 440-*d* from the device 405. The BSR 435-*d* may be an extended, pre-emptive BSR that triggers the parent device 410 to activate a sleep mode for one or more of its components.

As described herein with reference to FIGS. 3 and 4A, the device 405 may receive one or more messages from a UE 415-*a*, a UE 415-*b*, a device 420, or a combination thereof. The messages may trigger the device 405 to generate the BSR 435-*d* (e.g., an extended, pre-emptive BSR) for transmission to the parent device 410. The BSR 435-*a* may indicate one or more arrival times 425 associated with expected traffic 430 from the UE 415-*a*, the UE 415-*b*, the device 420, or any combination thereof, based on the information included in the messages. An arrival time 425 may be a time at which expected traffic 430 (e.g., future uplink transmissions) transmitted by the UE 415-*a*, the UE 415-*b*, and the device 420 is to be received at the device 405 (e.g., an MT antenna of the device 405).

The device 405 may transmit a BSR 435 to the parent device 410 in a BSR message 440, which may include additional information. For example, the device 405 may transmit the BSR 435-*d* to the parent device 410 in the BSR message 440-*d*, where the BSR message 440-*d* may also include an indication of one or more arrival times 425 of expected traffic 430, and a priority 445 of the UEs 415 and the device 420. The priority 445 included in the BSR message 440-*d* may assist the parent device 410 in prioritizing communications with the device 405 or activating a sleep mode for one or more of its components. For example, if the UE 415-*a* is associated with the shortest arrival time 425 as described herein with reference to FIG. 4A, and if the UE 415-*a* has a relatively low priority as indicated in the BSR message 440-*d*, the parent device 410 may activate a sleep mode for the time prior to the arrival time 425 associated with the UE 415-*a*, determining that the expected traffic 430 associated with the UE 415-*a* may be delayed. Accordingly, the BSR 435-*d* indicated in the BSR message 440-*d* may be a pre-emptive, extended BSR that indicates arrival times 425 of future, expected traffic 430 (e.g., future uplink transmissions) transmitted from one or more UEs 415, devices 420 (e.g., child IAB nodes), or a combination thereof, to a device 405, which may be an IAB node.

In some examples, if the device 405 is an IAB node, the device 405 may transmit the BSR 435-c to the parent device 410 in the BSR message 440-c. The BSR 435-c may be a pre-emptive BSR, which may indicate a current buffer status of the UE 415-a, a UE 415-b, a device 420, or any combination thereof in communication with the device 405 to assist the parent device 410 in activating a sleep mode for one or more of its components. For example, the BSR 435-c may indicate how many uplink transmissions, the UE 415-a, the UE 415-b, and the device 420 are currently transmitting to the device 405.

Alternatively, if the device 405 is a network entity, a UE 415-a may transmit the BSR 435-a to the device 405 in the BSR message 440-a. The BSR 435-a may indicate a current buffer status of the UE 415-a to assist the device 405 in activating a sleep mode for one or more of its components. For example, the BSR 435-a may indicate how many uplink transmissions the UE 415-a is currently transmitting to the device 405, or how many sidelink transmissions the UE 415-a is currently transmitting with another UE 415 (e.g., a UE 415-b).

In some examples, the UE 415-a may transmit the BSR 435-b to the device 405 (e.g., a network entity) in the BSR message 440-b. The BSR 435-b may be an extended BSR, which may indicate a future buffer status of the UE 415-a to assist the device 405 in activating a sleep mode for one or more of its components. For example, the BSR 435-b may indicate how many uplink transmissions the UE 415-a is to transmit to the device 405 in the future (e.g., expected traffic 430), or how many sidelink transmissions the UE 415-a is to transmit to another UE 415 (e.g., a UE 415-b), where the uplink transmissions or the sidelink transmissions are to arrive at the device 405 or the UE 415-b, respectively, at a particular arrival time 425.

Figure 5:
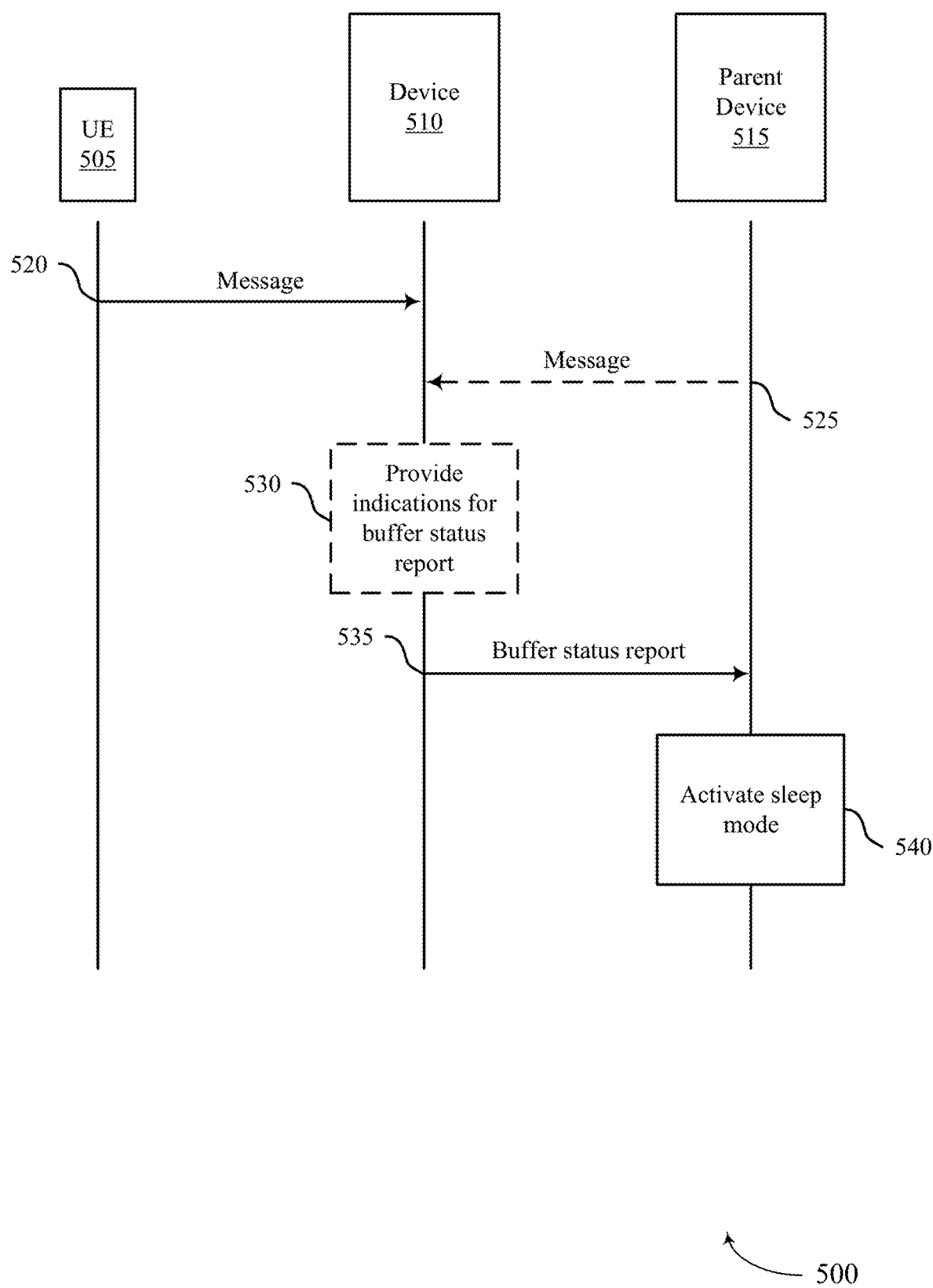
FIG. 5 illustrates an example of a process flow that supports pre-emptive BSR extension for network power saving in accordance with one or more aspects of the present disclosure.

FIG. 5 illustrates an example of a process flow 500 that supports pre-emptive BSR extension for network power saving in accordance with one or more aspects of the present disclosure. The process flow 500 may implement aspects of wireless communications systems 100 and 300, or may be implemented by aspects of the wireless communications systems 100 and 300. For example, the process flow 500 may illustrate operations between a UE 505, a device 510 (e.g., an IAB node), a parent device 515 (e.g., a parent IAB node) which may be examples of corresponding devices described herein. In the following description of the process flow 500, the operations between the UE 505, the device 510, and the parent device 515 may be transmitted in a different order than the example order shown, or the operations performed by the UE 505, the device 510, and the parent device 515 may be performed in different orders or at different times. Some operations may also be omitted from the process flow 500, and other operations may be added to the process flow 500.

At 520, the device 510 may obtain one or more messages from one or more second devices in communication with the device 510, including one or more UEs (e.g., the UE 505), one or more child devices (e.g., child IAB nodes), or both. The one or more messages may trigger generation of a first BSR (e.g., an extended, pre-emptive BSR) by the device 510. For example, the one or more messages may include a BSR or an extended BSR, or the one or more messages may indicate that a second device has entered a sleep mode.

At 525, the device 510 may obtain one or more messages from the parent device 515, where the parent device 515 is a parent of the device 510 and is of the one or more second devices. In some examples, the one or more messages may trigger the generation of the first BSR by the device 510.

At 530, the device 510 may generate the first BSR based on receiving the one or more messages. The device 510 may provide an indication of one or more arrival times associated with expected traffic for the one or more second devices in communication with the first device in the first BSR based on the one or more messages received at the device 510. For example, the device 510 may include an indication of an average arrival time associated with expected traffic of one or more second devices of one or more types (e.g., a first type being a UE, a second type being a child IAB node). Additionally, or alternatively, the device 510 may include an indication of a minimum arrival time associated with the expected traffic of the one or more second devices.

At 535, the device 510 may output a BSR message including the first BSR, the first BSR indicating the one or more arrival times associated with the expected traffic in communication with the first device for the one or more second devices based on the one or more messages. In some examples, the BSR message may additionally carry a second BSR (e.g., a pre-emptive BSR), where a first set of one or more bits in the BSR message may be used for the first BSR and a second set of one or more bits in the BSR message may be used for the second BSR.

At 540, the parent device 515 may activate a sleep mode for one or more components associated with the parent device 515 based on the one or more arrival times indicated in the first BSR report. For example, the parent device 515 may activate a sleep mode (e.g., a light sleep mode, a deep sleep mode) for an MT antenna, a DU, or an RU associated with the parent device 515 based on the one or more arrival times.

Figure 6:
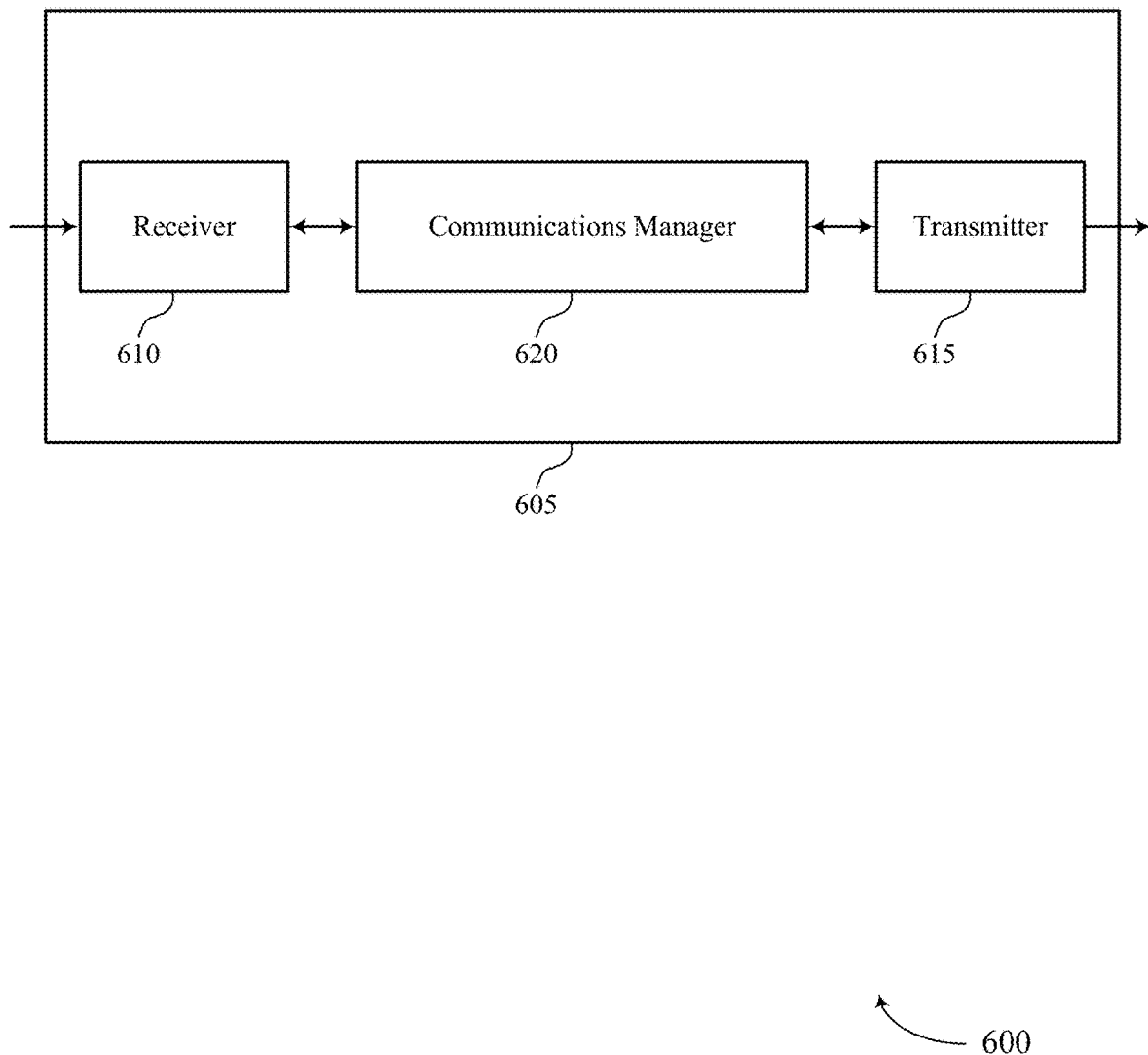
FIGS. 6 and 7 show block diagrams of devices that support pre-emptive BSR extension for network power saving in accordance with one or more aspects of the present disclosure.

FIG. 6 shows a block diagram 600 of a device 605 that supports pre-emptive BSR extension for network power saving in accordance with one or more aspects of the present disclosure. The device 605 may be an example of aspects of a device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to pre-emptive BSR extension for network power saving). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to pre-emptive BSR extension for network power saving). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of pre-emptive BSR extension for network power saving as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 may be configured as or otherwise support a means for obtaining one or more messages from one or more second devices in communication with the first device, the one or more messages triggering generation of a first BSR by the first device. The communications manager 620 may be configured as or otherwise support a means for outputting a BSR message including the first BSR, the first BSR indicating one or more arrival times associated with expected traffic for the one or more second devices in communication with the first device based on the one or more messages.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for communicating a BSR indicating arrival times for expected traffic associated with one or more UEs, child IAB nodes, or any combination thereof at a device, which may assist a parent device in activating a sleep mode for one or more of its components. As such, the described techniques may support increased power savings, signaling efficiency, and communication reliability.

Figure 7:
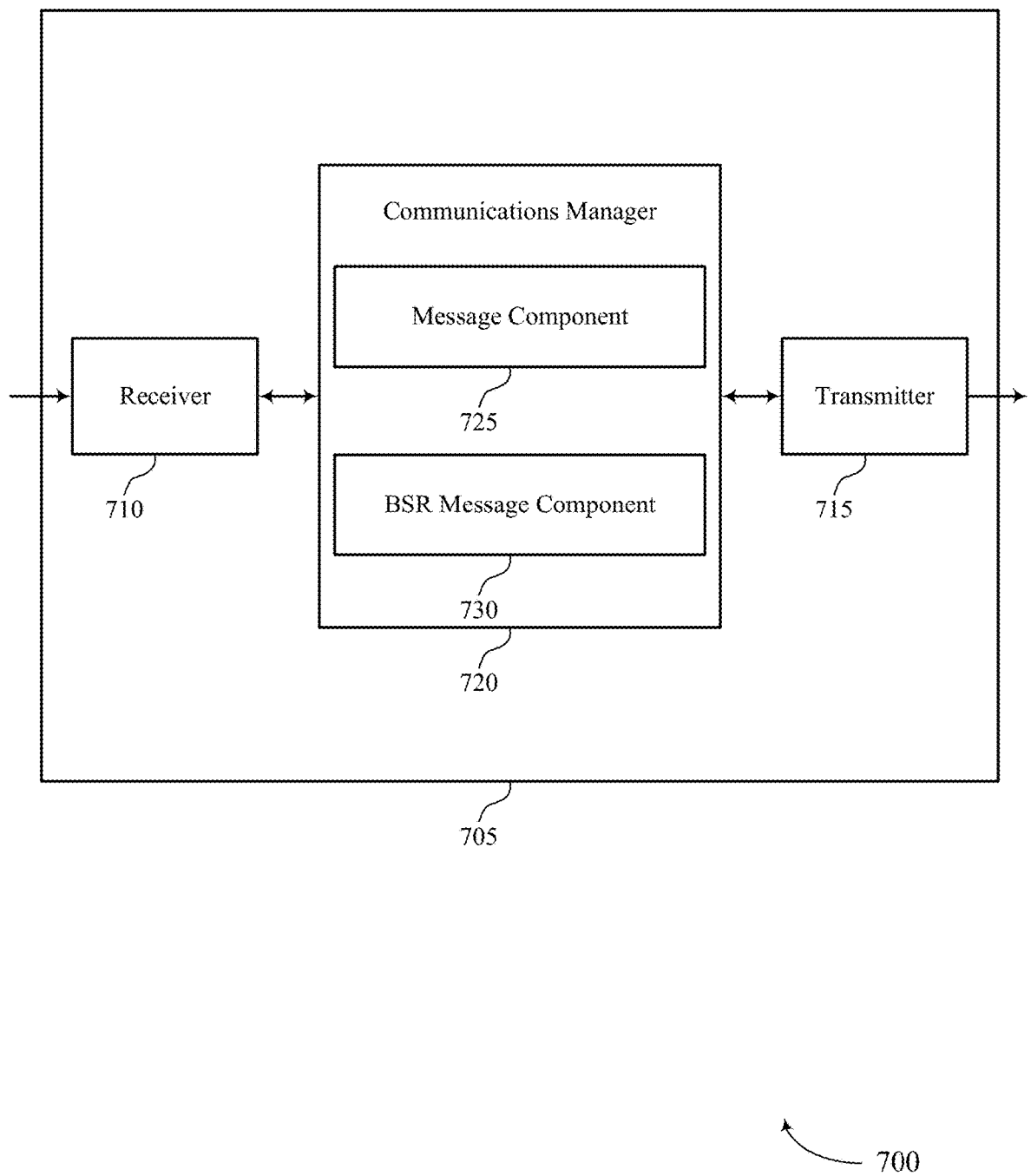

FIG. 7 shows a block diagram 700 of a device 705 that supports pre-emptive BSR extension for network power saving in accordance with one or more aspects of the present disclosure. The device 705 may be an example of aspects of a device 605 or a device 305 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to pre-emptive BSR extension for network power saving). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to pre-emptive BSR extension for network power saving). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of pre-emptive BSR extension for network power saving as described herein. For example, the communications manager 720 may include a message component 725 an BSR message component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The message component 725 may be configured as or otherwise support a means for obtaining one or more messages from one or more second devices in communication with the first device, the one or more messages triggering generation of a first BSR by the first device. The BSR message component 730 may be configured as or otherwise support a means for outputting a BSR message including the first BSR, the first BSR indicating one or more arrival times associated with expected traffic for the one or more second devices in communication with the first device based on the one or more messages.

Figure 8:
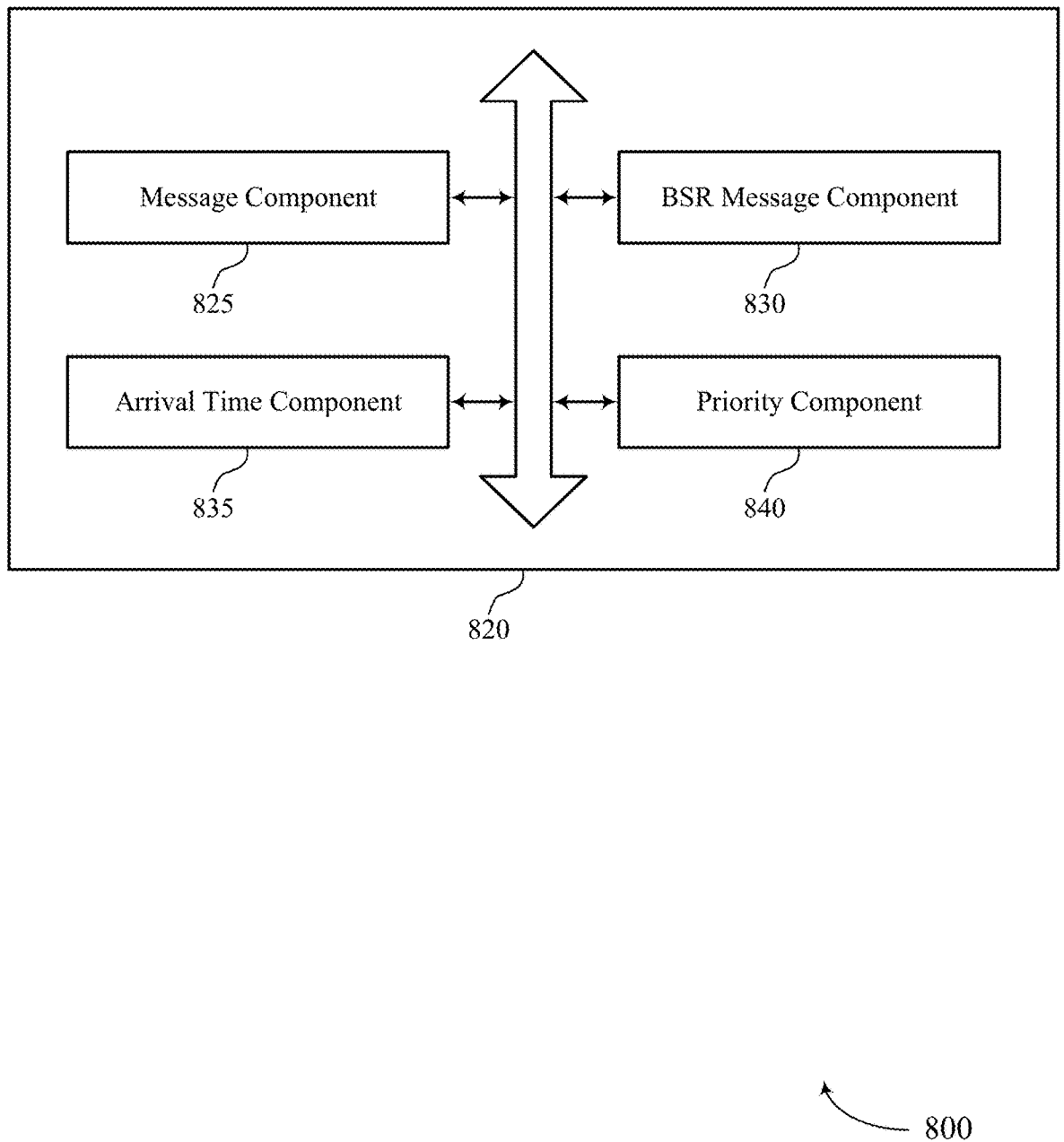
FIG. 8 shows a block diagram of a communications manager that supports pre-emptive BSR extension for network power saving in accordance with one or more aspects of the present disclosure.

FIG. 8 shows a block diagram 800 of a communications manager 820 that supports pre-emptive BSR extension for network power saving in accordance with one or more aspects of the present disclosure. The communications manager 820 may be an example of aspects of a communications manager 620, a communications manager 720, or both, as described herein. The communications manager 820, or various components thereof, may be an example of means for performing various aspects of pre-emptive BSR extension for network power saving as described herein. For example, the communications manager 820 may include a message component 825, an BSR message component 830, an arrival time component 835, a priority component 840, or any combination thereof. Each of these components may communicate, directly or indirectly, with one another (e.g., via one or more buses).

The message component 825 may be configured as or otherwise support a means for obtaining one or more messages from one or more second devices in communication with the first device, the one or more messages triggering generation of a first BSR by the first device. The BSR message component 830 may be configured as or otherwise support a means for outputting a BSR message including the first BSR, the first BSR indicating one or more arrival times associated with expected traffic for the one or more second devices in communication with the first device based on the one or more messages.

In some examples, the BSR message component 830 may be configured as or otherwise support a means for outputting the BSR message including the first BSR and a second BSR, where a first set of one or more bits of the BSR message is used for the first BSR and a second set of one or more bits of the BSR message is used for the second BSR, the second BSR indicating one or more arrival times associated with current traffic for the one or more second devices.

In some examples, the message component 825 may be configured as or otherwise support a means for obtaining the one or more messages from the one or more second devices, the one or more messages including one or more second BSRs triggering the generation of the first BSR by the first device.

In some examples, the message component 825 may be configured as or otherwise support a means for obtaining the one or more messages indicating a periodicity for generating the first BSR, where the BSR message is output according to the periodicity.

In some examples, the message component 825 may be configured as or otherwise support a means for obtaining the one or more messages from a parent device of the first device, the one or more messages triggering the generation of the first BSR by the first device, wherein the one or more second devices includes the parent device.

In some examples, the message component 825 may be configured as or otherwise support a means for obtaining the one or more messages from the one or more second devices indicating that a sleep mode has been activated for one or more components associated with the one or more second devices, the sleep mode triggering the generation of the first BSR by the first device.

In some examples, the arrival time component 835 may be configured as or otherwise support a means for providing, for including within the first BSR, an indication of a first average arrival time associated with expected traffic for one or more second devices of a first type and a second average arrival time associated with the expected traffic for one or more second devices of a second type.

In some examples, the arrival time component 835 may be configured as or otherwise support a means for providing, for including within the first BSR, an indication of an average arrival time associated with the expected traffic for the one or more second devices, wherein the one or more second devices is of a first type or a second type.

In some examples, the arrival time component 835 may be configured as or otherwise support a means for providing, for including within the first BSR, an indication of a minimum arrival time associated with the expected traffic for the one or more second devices.

In some examples, the priority component 840 may be configured as or otherwise support a means for providing, for including within the first BSR, an indication of a priority associated with each of the one or more second devices.

In some examples, the BSR message component 830 may be configured as or otherwise support a means for outputting the BSR message at a time determined based on the one or more arrival times.

Figure 9:
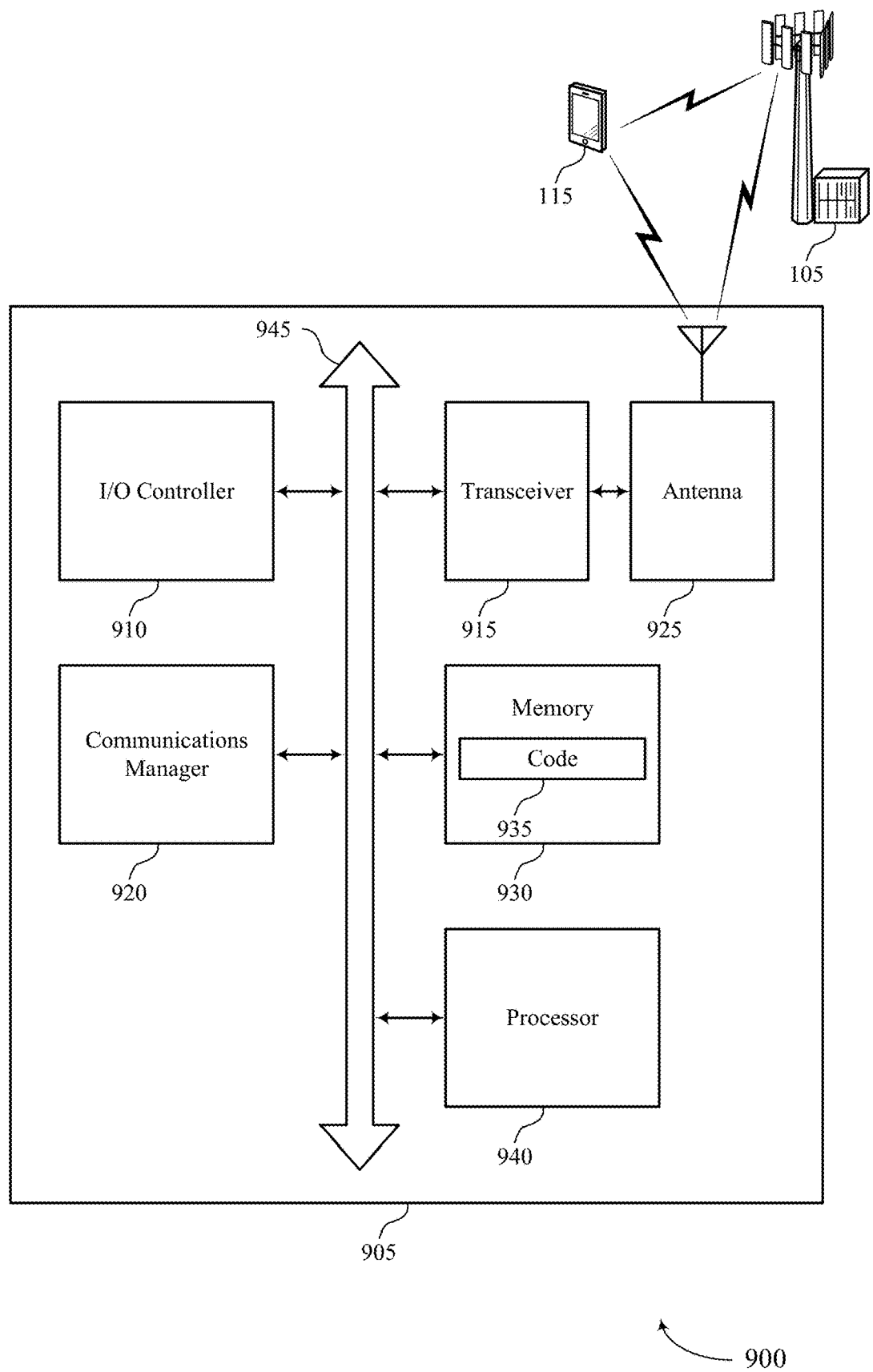
FIG. 9 shows a diagram of a system including a device that supports pre-emptive BSR extension for network power saving in accordance with one or more aspects of the present disclosure.

FIG. 9 shows a diagram of a system 900 including a device 905 that supports pre-emptive BSR extension for network power saving in accordance with one or more aspects of the present disclosure. The device 905 may be an example of or include the components of a device 605, a device 705, or a device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting pre-emptive BSR extension for network power saving). For example, the device 905 or a component of the device 905 may include a processor 940 and memory 930 coupled with or to the processor 940, the processor 940 and memory 930 configured to perform various functions described herein.

For example, the communications manager 920 may be configured as or otherwise support a means for obtaining one or more messages from one or more second devices in communication with the first device, the one or more messages triggering generation of a first BSR by the first device. The communications manager 920 may be configured as or otherwise support a means for outputting a BSR message including the first BSR, the first BSR indicating one or more arrival times associated with expected traffic for the one or more second devices based on the one or more messages.

By including or configuring the communications manager 920 in accordance with examples as described herein, the device 905 may support techniques for communicating a BSR indicating arrival times for expected traffic associated with one or more UEs, child IAB nodes, or any combination thereof at a device, which may assist a parent device in activating a sleep mode for one or more of its components. As such, the described techniques may support increased power savings, signaling efficiency, and communication reliability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of pre-emptive BSR extension for network power saving as described herein, or the processor 940 and the memory 930 may be otherwise configured to perform or support such operations.

Figure 10:
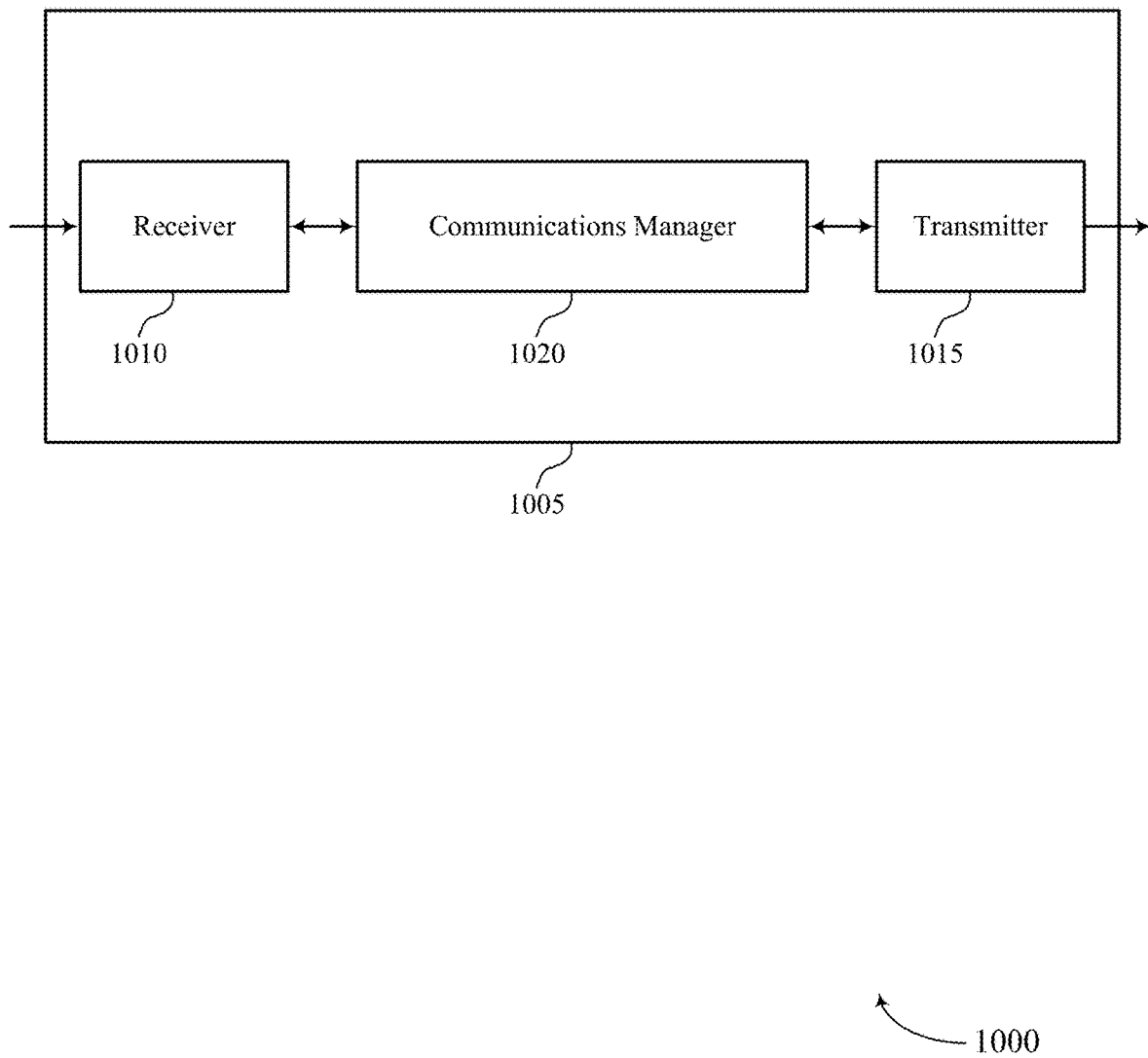
FIGS. 10 and 11 show block diagrams of devices that support pre-emptive BSR extension for network power saving in accordance with one or more aspects of the present disclosure.

FIG. 10 shows a block diagram 1000 of a device 1005 that supports pre-emptive BSR extension for network power saving in accordance with one or more aspects of the present disclosure. The device 1005 may be an example of aspects of a parent device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of pre-emptive BSR extension for network power saving as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first device in a wireless network in accordance with examples as disclosed herein. For example, the communications manager 1020 may be configured as or otherwise support a means for obtaining a BSR message including a first BSR from a second device, the first BSR indicating one or more arrival times associated with expected traffic for one or more third devices in communication with the second device. The communications manager 1020 may be configured as or otherwise support a means for activating a sleep mode for one or more components associated with the first device based on the one or more arrival times indicated in the first BSR.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for communicating a BSR indicating arrival times for expected traffic associated with one or more UEs, child IAB nodes, or any combination thereof at a device, which may assist a parent device in activating a sleep mode for one or more of its components. As such, the described techniques may support increased power savings, signaling efficiency, and communication reliability.

Figure 11:
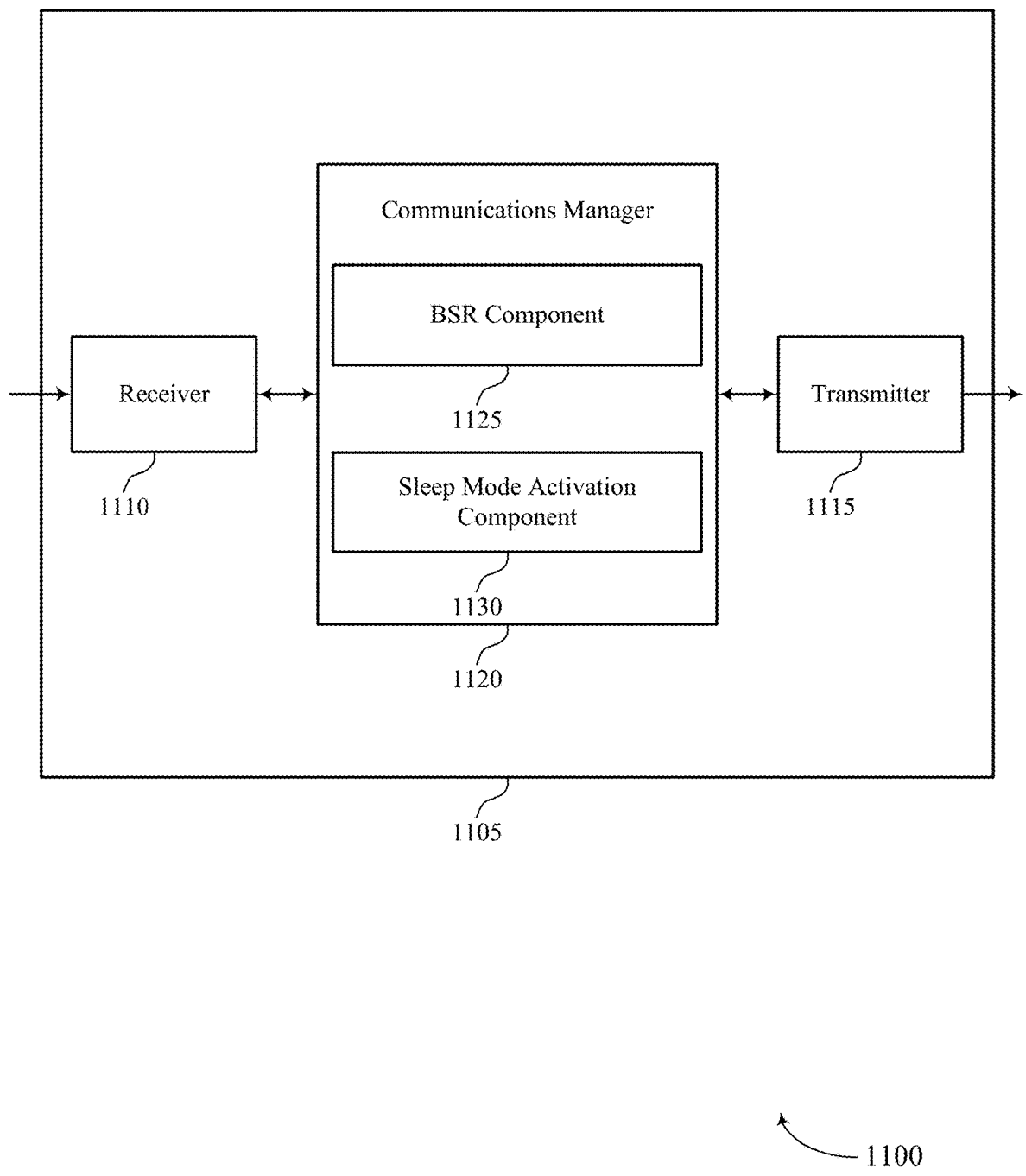

FIG. 11 shows a block diagram 1100 of a device 1105 that supports pre-emptive BSR extension for network power saving in accordance with one or more aspects of the present disclosure. The device 1105 may be an example of aspects of a device 1005 or a parent device 310 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of pre-emptive BSR extension for network power saving as described herein. For example, the communications manager 1120 may include an BSR component 1125 a sleep mode activation component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first device in a wireless network in accordance with examples as disclosed herein. The BSR component 1125 may be configured as or otherwise support a means for obtaining a BSR message including a first BSR from a second device, the first BSR indicating one or more arrival times associated with expected traffic for one or more third devices in communication with the second device. The sleep mode activation component 1130 may be configured as or otherwise support a means for activating a sleep mode for one or more components associated with the first device based on the one or more arrival times indicated in the first BSR.

Figure 12:
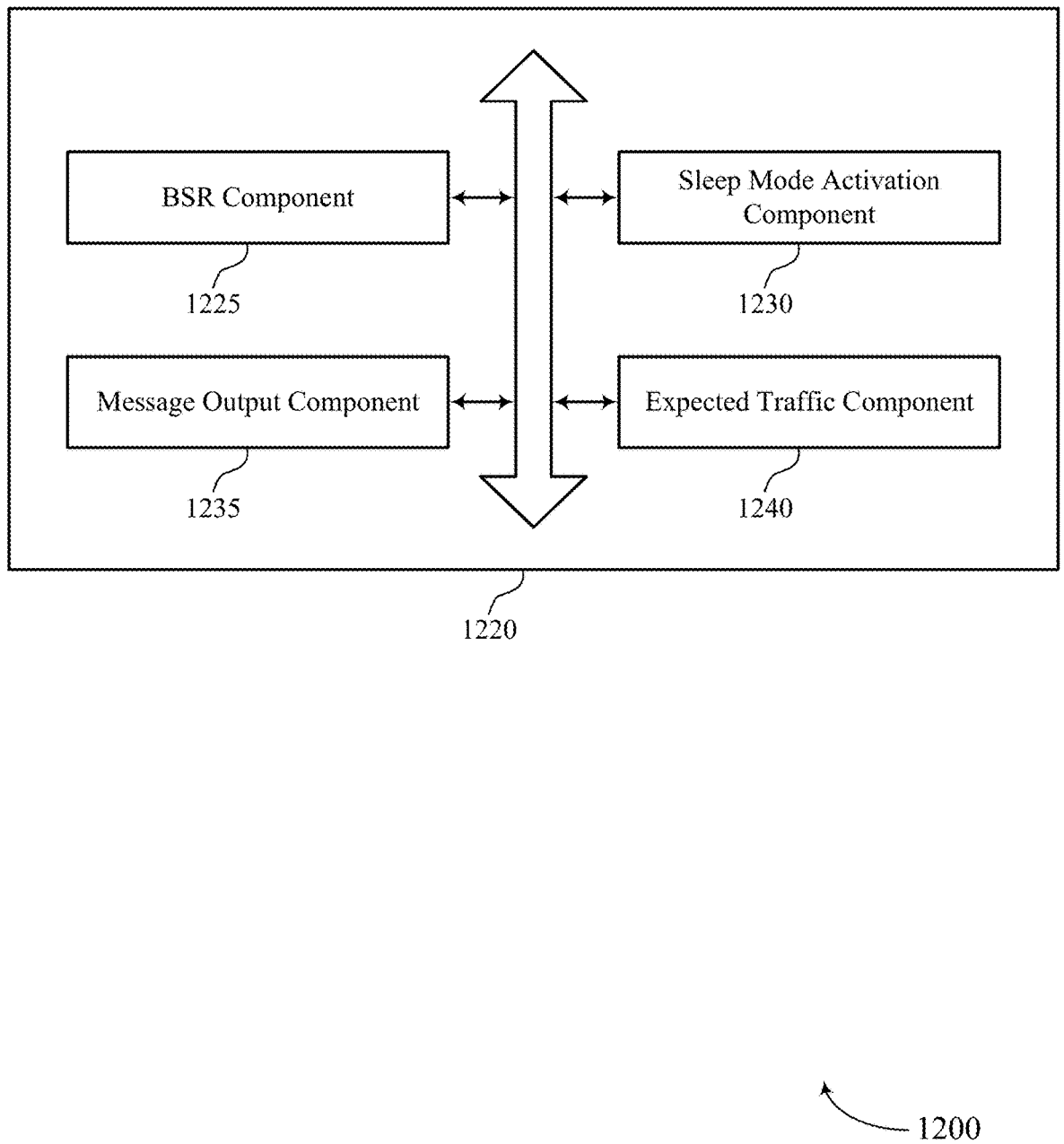
FIG. 12 shows a block diagram of a communications manager that supports pre-emptive BSR extension for network power saving in accordance with one or more aspects of the present disclosure.

FIG. 12 shows a block diagram 1200 of a communications manager 1220 that supports pre-emptive BSR extension for network power saving in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of pre-emptive BSR extension for network power saving as described herein. For example, the communications manager 1220 may include an BSR component 1225, a sleep mode activation component 1230, a message output component 1235, an expected traffic component 1240, or any combination thereof. Each of these components may communicate, directly or indirectly, with one another (e.g., via one or more buses).

The communications manager 1220 may support wireless communication at a first device in a wireless network in accordance with examples as disclosed herein. The BSR component 1225 may be configured as or otherwise support a means for obtaining a BSR message including a first BSR from a second device, the first BSR indicating one or more arrival times associated with expected traffic for one or more third devices in communication with the second device. The sleep mode activation component 1230 may be configured as or otherwise support a means for activating a sleep mode for one or more components associated with the first device based on the one or more arrival times indicated in the first BSR.

In some examples, the BSR component 1225 may be configured as or otherwise support a means for obtaining the BSR message including the first BSR and a second BSR, where a first set of one or more bits of the BSR message are used for the first BSR and a second set of one or more bits of the BSR message are used for the second BSR, the second BSR indicating one or more arrival times associated with current traffic for the one or more third devices.

In some examples, the message output component 1235 may be configured as or otherwise support a means for outputting one or more messages to the second device triggering generation of the first BSR by the second device.

In some examples, the expected traffic component 1240 may be configured as or otherwise support a means for obtaining, within the first BSR, an indication of a first average arrival time associated with the expected traffic for one or more third devices of a first type and a second average arrival time associated with the expected traffic for one or more third devices of a second type.

In some examples, the expected traffic component 1240 may be configured as or otherwise support a means for obtaining, within the first BSR, an indication of an average arrival time associated with the expected traffic for the one or more third devices, wherein the one or more third devices is of a first type or a second type.

In some examples, the expected traffic component 1240 may be configured as or otherwise support a means for obtaining, within the first BSR, an indication of a minimum arrival time associated with the expected traffic for the one or more third devices.

In some examples, the expected traffic component 1240 may be configured as or otherwise support a means for obtaining, within the first BSR, an indication of a priority associated with each of the one or more third devices.

In some examples, the sleep mode activation component 1230 may be configured as or otherwise support a means for activating the sleep mode for the one or more components associated with the first device based on obtainment of the BSR message at a time determined based on the one or more arrival times.

Figure 13:
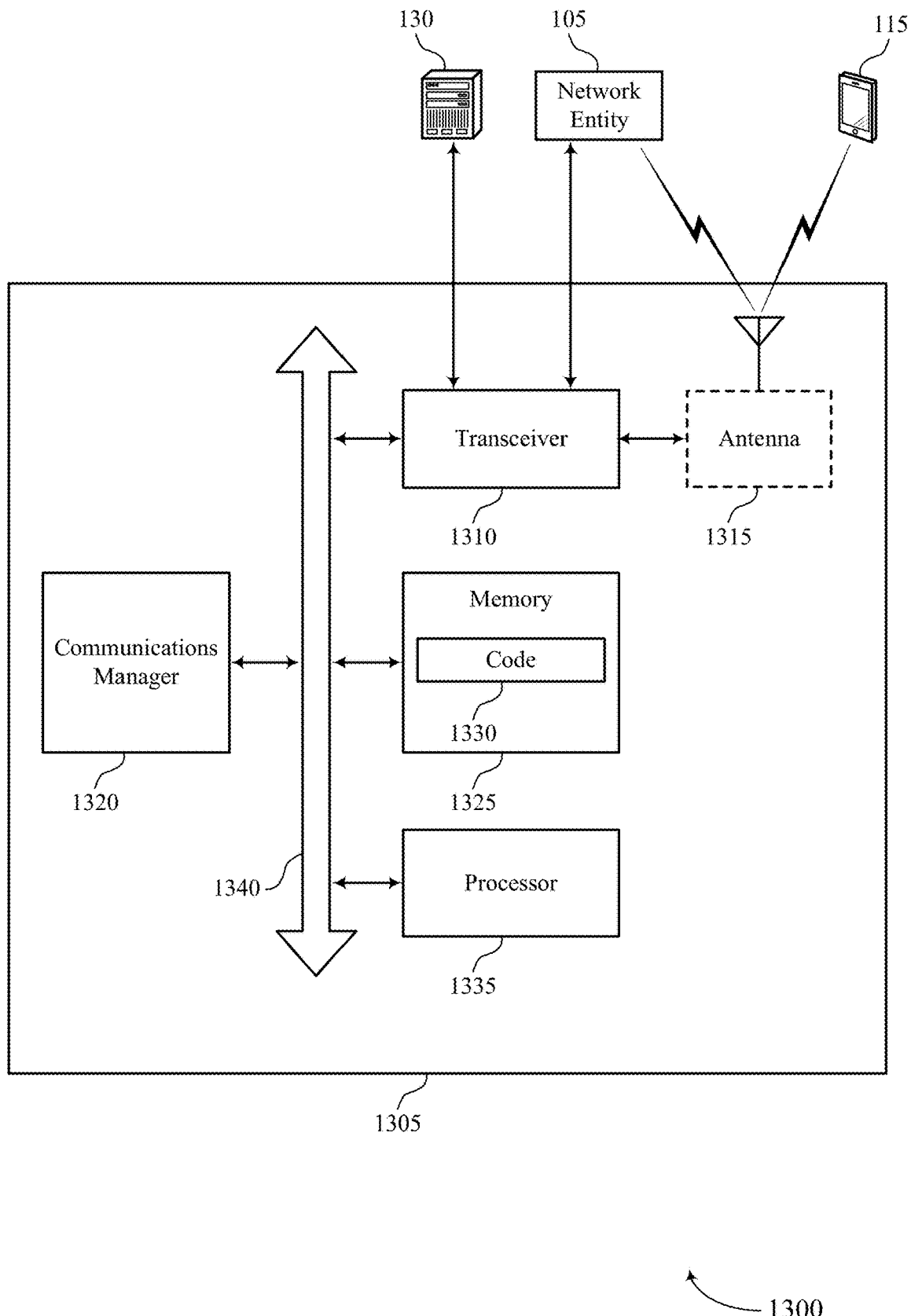
FIG. 13 shows a diagram of a system including a device that supports pre-emptive BSR extension for network power saving in accordance with one or more aspects of the present disclosure.

FIG. 13 shows a diagram of a system 1300 including a device 1305 that supports pre-emptive BSR extension for network power saving in accordance with one or more aspects of the present disclosure. The device 1305 may be an example of or include the components of a device 1005, a device 1105, or a parent device as described herein. The device 1305 may include components for bi-directional voice and data communications including components for transmitting and receiving communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting pre-emptive BSR extension for network power saving). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first device in a wireless network in accordance with examples as disclosed herein. For example, the communications manager 1320 may be configured as or otherwise support a means for obtaining a BSR message including a first BSR from a second device, the first BSR indicating one or more arrival times associated with expected traffic for one or more third devices in communication with the second device. The communications manager 1320 may be configured as or otherwise support a means for activating a sleep mode for one or more components associated with the first device based on the one or more arrival times indicated in the first BSR.

By including or configuring the communications manager 1320 in accordance with examples as described herein, the device 1305 may support techniques for communicating a BSR indicating arrival times for expected traffic associated with one or more UEs, child IAB nodes, or any combination thereof at a device, which may assist a parent device in activating a sleep mode for one or more of its components. As such, the described techniques may support increased power savings, signaling efficiency, and communication reliability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of pre-emptive BSR extension for network power saving as described herein, or the processor 1335 and the memory 1325 may be otherwise configured to perform or support such operations.

Figure 14:
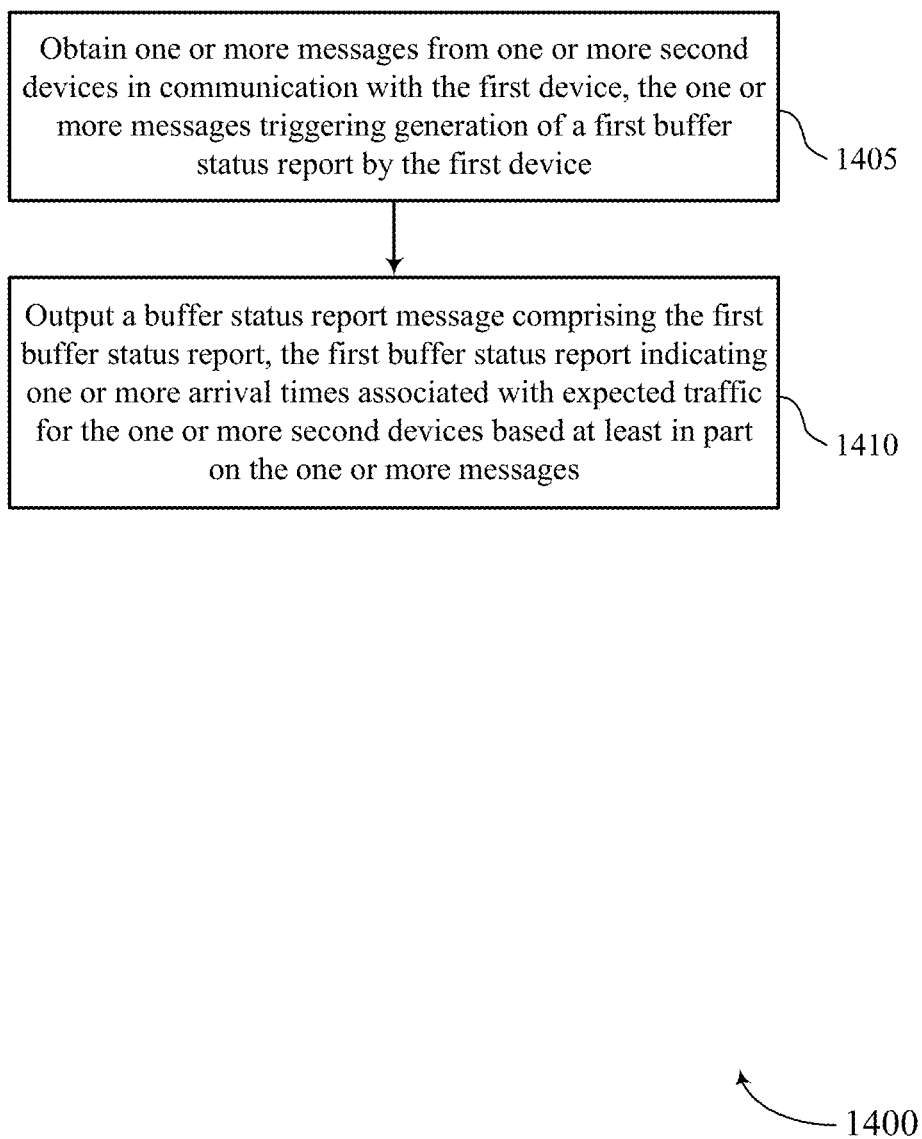
FIGS. 14 through 19 show flowcharts illustrating methods that support pre-emptive BSR extension for network power saving in accordance with one or more aspects of the present disclosure.

FIG. 14 shows a flowchart illustrating a method 1400 that supports pre-emptive BSR extension for network power saving in accordance with one or more aspects of the present disclosure. The operations of the method 1400 may be implemented by a device or its components as described herein. For example, the operations of the method 1400 may be performed by a device as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1405, the method may include obtaining one or more messages from one or more second devices in communication with the first device, the one or more messages triggering generation of a first BSR by the first device. The operations of 1405 may be performed in accordance with examples as disclosed herein. In some examples, aspects of the operations of 1405 may be performed by a message component 825 as described with reference to FIG. 8.

At 1410, the method may include outputting a BSR message including the first BSR, the first BSR indicating one or more arrival times associated with expected traffic for the one or more second devices in communication with the first device based on the one or more messages. The operations of 1410 may be performed in accordance with examples as disclosed herein. In some examples, aspects of the operations of 1410 may be performed by an BSR message component 830 as described with reference to FIG. 8.

Figure 15:
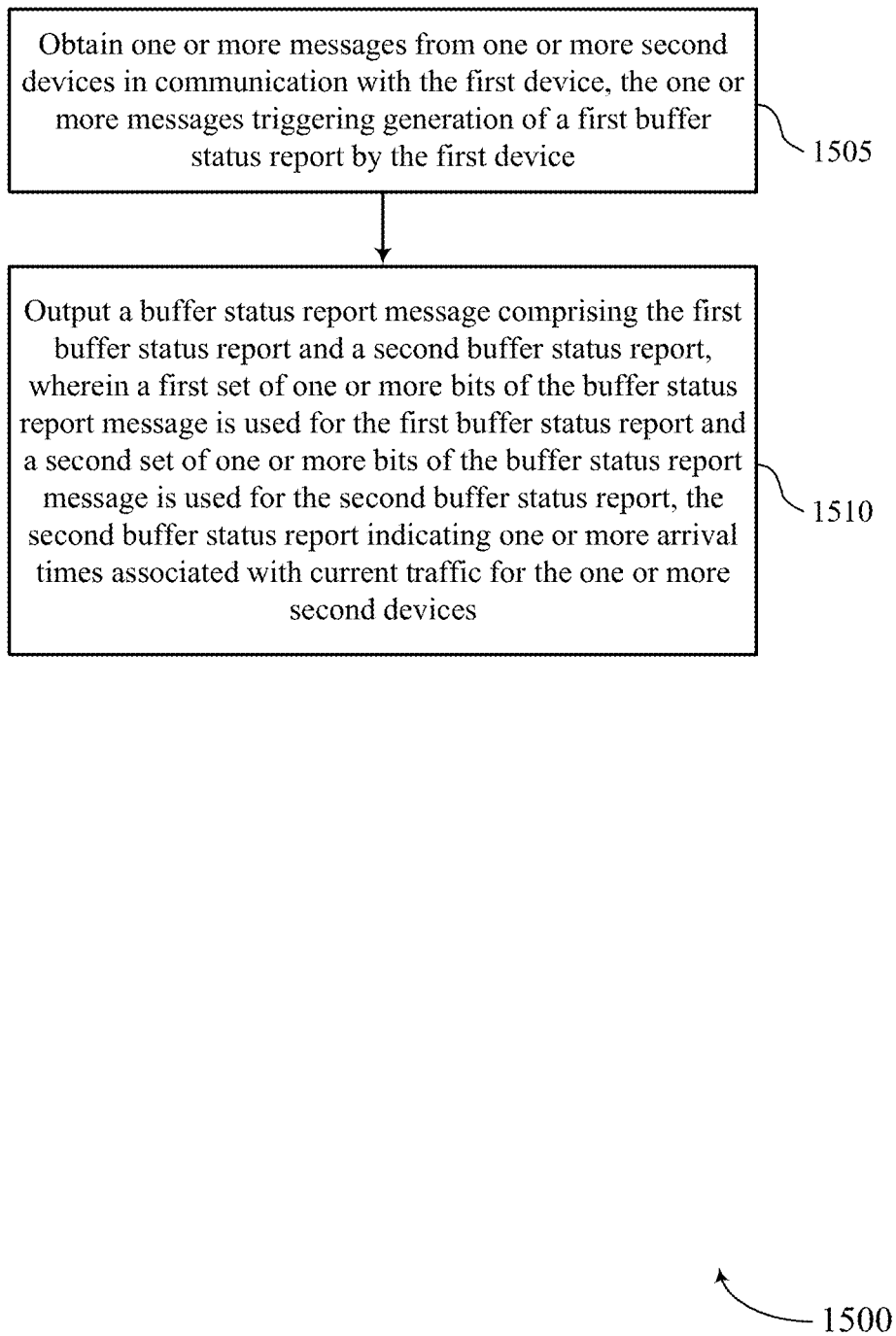

FIG. 15 shows a flowchart illustrating a method 1500 that supports pre-emptive BSR extension for network power saving in accordance with one or more aspects of the present disclosure. The operations of the method 1500 may be implemented by a device or its components as described herein. For example, the operations of the method 1500 may be performed by a device as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1505, the method may include obtaining one or more messages from one or more second devices in communication with the first device, the one or more messages triggering generation of a first BSR by the first device. The operations of 1505 may be performed in accordance with examples as disclosed herein. In some examples, aspects of the operations of 1505 may be performed by a message component 825 as described with reference to FIG. 8.

At 1510, the method may include outputting a BSR message including the first BSR and a second BSR, where a first set of one or more bits of the BSR message is used for the first BSR and a second set of one or more bits of the BSR message is used for the second BSR, the second BSR indicating one or more arrival times associated with current traffic for the one or more second devices. The operations of 1510 may be performed in accordance with examples as disclosed herein. In some examples, aspects of the operations of 1510 may be performed by an BSR message component 830 as described with reference to FIG. 8.

Figure 16:
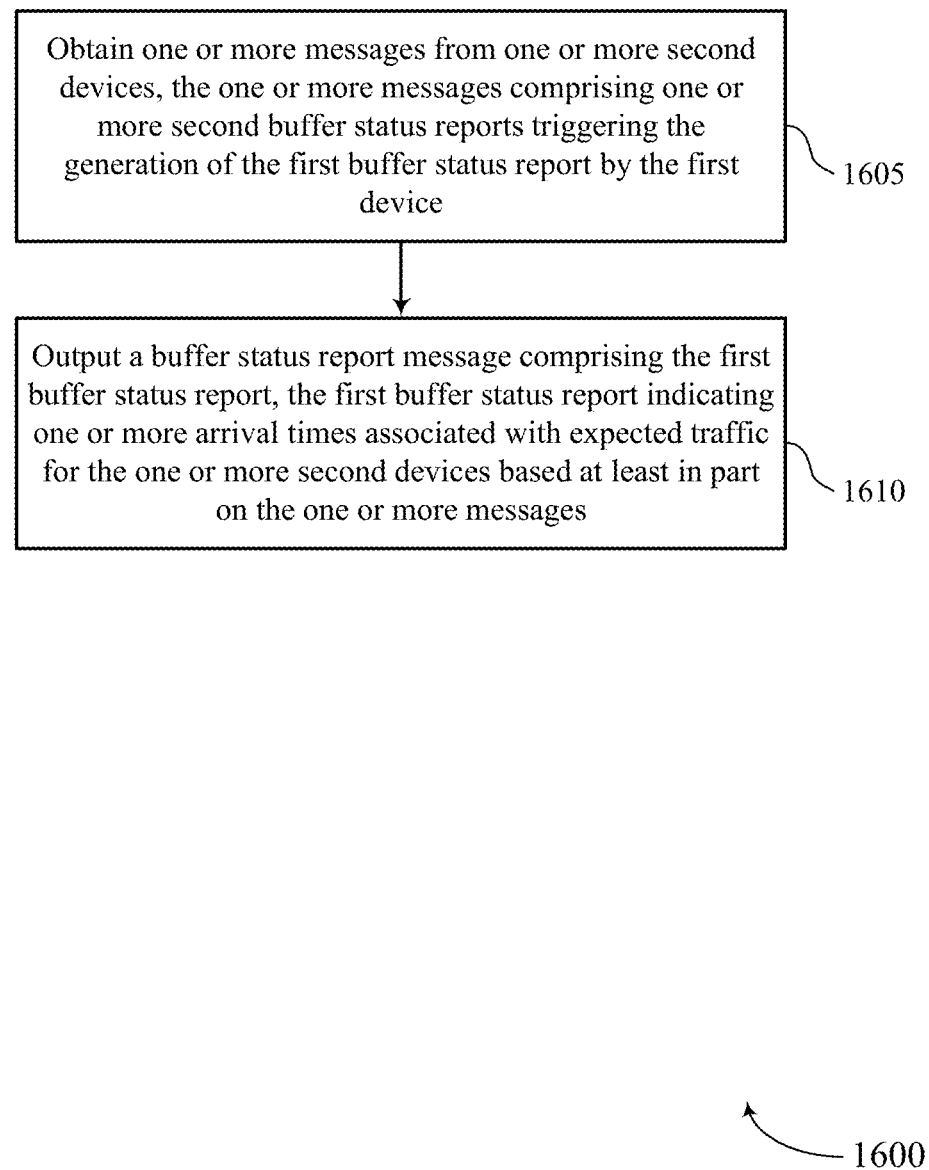

FIG. 16 shows a flowchart illustrating a method 1600 that supports pre-emptive BSR extension for network power saving in accordance with one or more aspects of the present disclosure. The operations of the method 1600 may be implemented by a device or its components as described herein. For example, the operations of the method 1600 may be performed by a device as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1605, the method may include obtaining one or more messages from one or more second devices, the one or more messages including one or more second BSRs triggering the generation of the first BSR by the first device. The operations of 1605 may be performed in accordance with examples as disclosed herein. In some examples, aspects of the operations of 1605 may be performed by a message component 825 as described with reference to FIG. 8.

At 1610, the method may include outputting a BSR message including the first BSR, the first BSR indicating one or more arrival times associated with expected traffic for the one or more second devices in communication with the first device based on the one or more messages. The operations of 1610 may be performed in accordance with examples as disclosed herein. In some examples, aspects of the operations of 1610 may be performed by an BSR message component 830 as described with reference to FIG. 8.

Figure 17:
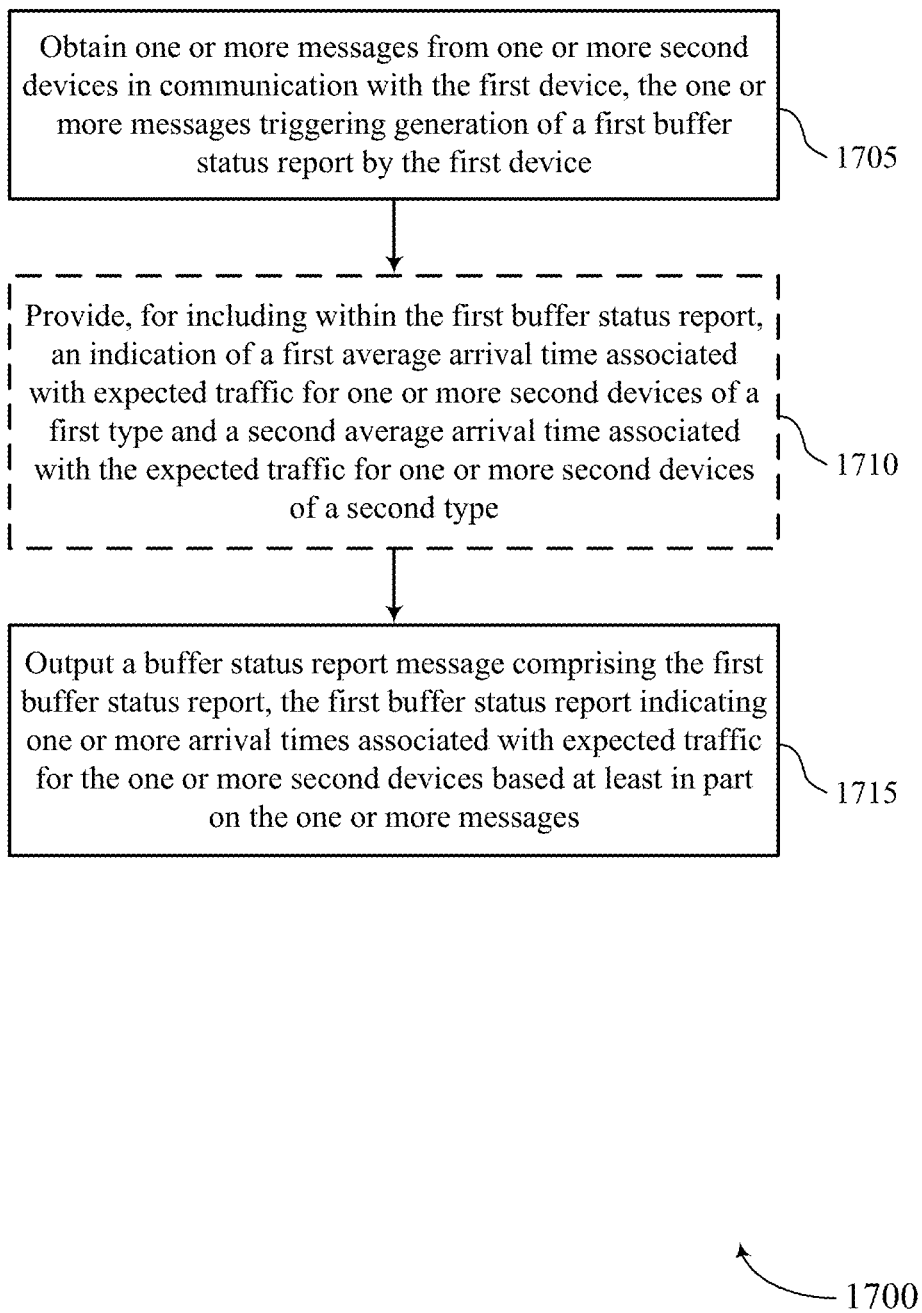

FIG. 17 shows a flowchart illustrating a method 1700 that supports pre-emptive BSR extension for network power saving in accordance with one or more aspects of the present disclosure. The operations of the method 1700 may be implemented by a device or its components as described herein. For example, the operations of the method 1700 may be performed by a device as described with reference to FIGS. 1 through 9. In some examples, a device may execute a set of instructions to control the functional elements of the device to perform the described functions. Additionally, or alternatively, the device may perform aspects of the described functions using special-purpose hardware.

At 1705, the method may include obtaining one or more messages from one or more second devices in communication with the first device, the one or more messages triggering generation of a first BSR by the first device. The operations of 1705 may be performed in accordance with examples as disclosed herein. In some examples, aspects of the operations of 1705 may be performed by a message component 825 as described with reference to FIG. 8.

At 1710, the method may include providing, for including within the first BSR, an indication of a first average arrival time associated with expected traffic for one or more second devices of a first type and a second average arrival time associated with the expected traffic for one or more second devices of a second type. The operations of 1710 may be performed in accordance with examples as disclosed herein. In some examples, aspects of the operations of 1710 may be performed by an arrival time component 835 as described with reference to FIG. 8.

At 1715, the method may include outputting a BSR message including the first BSR, the first BSR indicating one or more arrival times associated with expected traffic for the one or more second devices in communication with the first device based on the one or more messages. The operations of 1715 may be performed in accordance with examples as disclosed herein. In some examples, aspects of the operations of 1715 may be performed by an BSR message component 830 as described with reference to FIG. 8.

Figure 18:
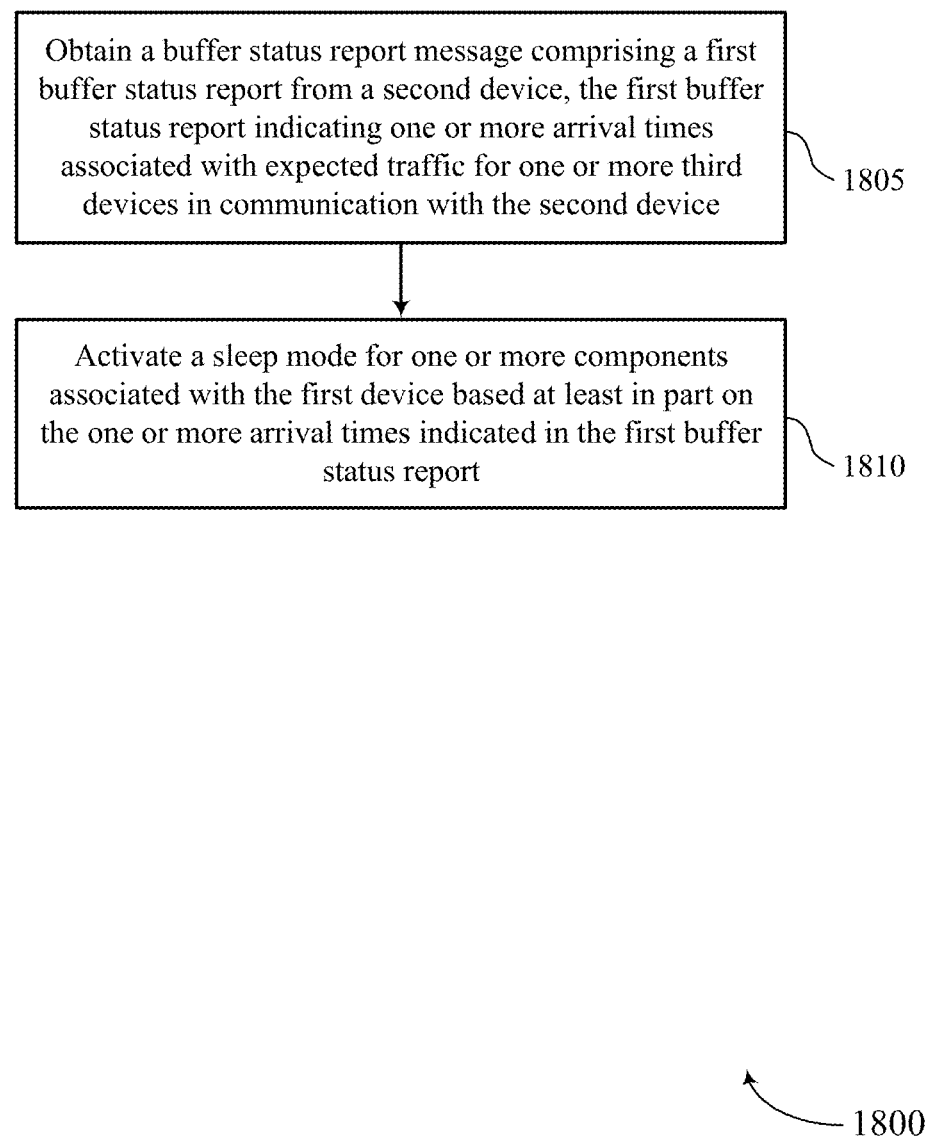

FIG. 18 shows a flowchart illustrating a method 1800 that supports pre-emptive BSR extension for network power saving in accordance with one or more aspects of the present disclosure. The operations of the method 1800 may be implemented by a parent device or its components as described herein. For example, the operations of the method 1800 may be performed by a parent device as described with reference to FIGS. 1 through 5 and 10 through 13. In some examples, a parent device may execute a set of instructions to control the functional elements of the parent device to perform the described functions. Additionally, or alternatively, the parent device may perform aspects of the described functions using special-purpose hardware.

At 1805, the method may include obtaining a BSR message including a first BSR from a second device, the first BSR indicating one or more arrival times associated with expected traffic for one or more third devices in communication with the second device. The operations of 1805 may be performed in accordance with examples as disclosed herein. In some examples, aspects of the operations of 1805 may be performed by an BSR component 1225 as described with reference to FIG. 12.

At 1810, the method may include activating a sleep mode for one or more components associated with the first device based on the one or more arrival times indicated in the first BSR. The operations of 1810 may be performed in accordance with examples as disclosed herein. In some examples, aspects of the operations of 1810 may be performed by a sleep mode activation component 1230 as described with reference to FIG. 12.

Figure 19:
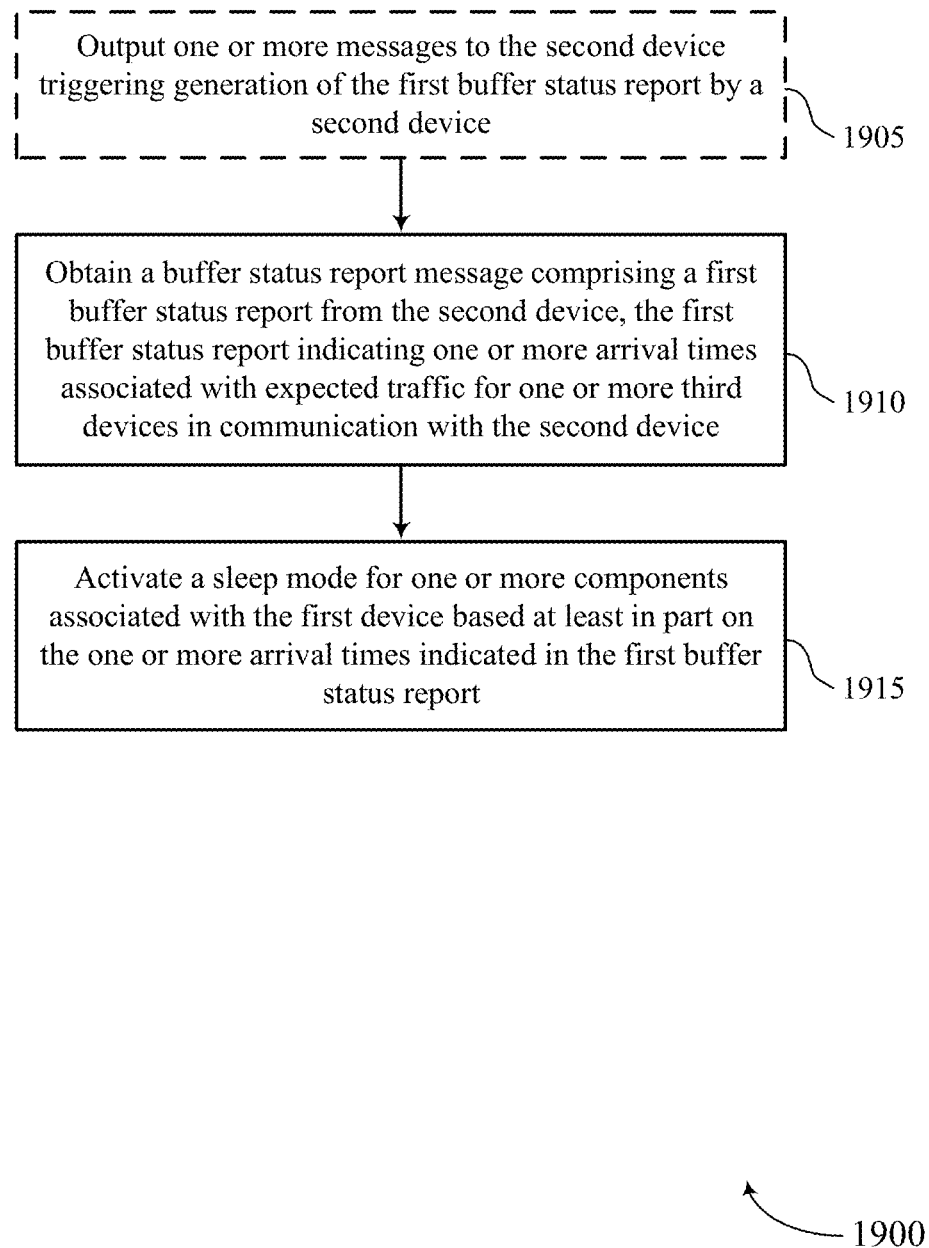

FIG. 19 shows a flowchart illustrating a method 1900 that supports pre-emptive BSR extension for network power saving in accordance with one or more aspects of the present disclosure. The operations of the method 1900 may be implemented by a parent device or its components as described herein. For example, the operations of the method 1900 may be performed by a parent device as described with reference to FIGS. 1 through 5 and 10 through 13. In some examples, a parent device may execute a set of instructions to control the functional elements of the parent device to perform the described functions. Additionally, or alternatively, the parent device may perform aspects of the described functions using special-purpose hardware.

At 1905, the method may include outputting one or more messages to the second device triggering generation of the first BSR by a second device. The operations of 1905 may be performed in accordance with examples as disclosed herein. In some examples, aspects of the operations of 1905 may be performed by a message output component 1235 as described with reference to FIG. 12.

At 1910, the method may include obtaining a BSR message including a first BSR from the second device, the first BSR indicating one or more arrival times associated with expected traffic for one or more third devices in communication with the second device. The operations of 1910 may be performed in accordance with examples as disclosed herein. In some examples, aspects of the operations of 1910 may be performed by an BSR component 1225 as described with reference to FIG. 12.

At 1915, the method may include activating a sleep mode for one or more components associated with the first device based on the one or more arrival times indicated in the first BSR. The operations of 1915 may be performed in accordance with examples as disclosed herein. In some examples, aspects of the operations of 1915 may be performed by a sleep mode activation component 1230 as described with reference to FIG. 12.

The following provides an overview of aspects of the present disclosure:

Aspect 1: A method for wireless communication at a first device comprising: obtaining one or more messages from one or more second devices in communication with the first device, the one or more messages triggering generation of a first BSR by the first device; and outputting a BSR message comprising the first BSR, the first BSR indicating one or more arrival times associated with expected traffic for the one or more second devices in communication with the first device based at least in part on the one or more messages.

Aspect 2: The method of aspect 1, the outputting comprising: outputting the BSR message comprising the first BSR and a second BSR, wherein a first set of one or more bits of the BSR message is used for the first BSR and a second set of one or more bits of the BSR message is used for the second BSR, the second BSR indicating one or more arrival times associated with current traffic for the one or more second devices.

Aspect 3: The method of any of aspects 1 through 2, the obtaining comprising: obtaining the one or more messages from the one or more second devices, the one or more messages comprising one or more second BSRs triggering the generation of the first BSR by the first device.

Aspect 4: The method of any of aspects 1 through 3, the obtaining comprising: obtaining the one or more messages indicating a periodicity for generating the first BSR, wherein the BSR message is output according to the periodicity.

Aspect 5: The method of any of aspects 1 through 4, the obtaining comprising: obtaining the one or more messages from a parent device of the first device, the one or more messages triggering the generation of the first BSR by the first device, wherein the one or more second devices includes the parent device.

Aspect 6: The method of any of aspects 1 through 5, the obtaining comprising: obtaining the one or more messages from the one or more second devices indicating that a sleep mode has been activated for one or more components associated with the one or more second devices, the sleep mode triggering the generation of the first BSR by the first device.

Aspect 7: The method of any of aspects 1 through 6, further comprising: providing, for including within the first BSR, an indication of a first average arrival time associated with expected traffic for one or more second devices of a first type and a second average arrival time associated with the expected traffic for one or more second devices of a second type.

Aspect 8: The method of any of aspects 1 through 7, further comprising: providing, for including within the first BSR, an indication of an average arrival time associated with the expected traffic for the one or more second devices, wherein the one or more second devices is of a first type or a second type.

Aspect 9: The method of any of aspects 1 through 8, further comprising: providing, for including within the first BSR, an indication of a minimum arrival time associated with the expected traffic for the one or more second devices.

Aspect 10: The method of any of aspects 1 through 9, further comprising: providing, for including within the first BSR, an indication of a priority associated with each of the one or more second devices.

Aspect 11: The method of any of aspects 1 through 10, the outputting comprising: outputting the BSR message at a time determined based at least in part on the one or more arrival times.

Aspect 12: A method for wireless communication at a first device in a wireless network, comprising: obtaining a BSR message comprising a first BSR from a second device, the first BSR indicating one or more arrival times associated with expected traffic for one or more third devices in communication with the second device; and activating a sleep mode for one or more components associated with the first device based at least in part on the one or more arrival times indicated in the first BSR.

Aspect 13: The method of aspect 12, the obtaining comprising: obtaining the BSR message including the first BSR and a second BSR, wherein a first set of one or more bits of the BSR message are used for the first BSR and a second set of one or more bits of the BSR message are used for the second BSR, the second BSR indicating one or more arrival times associated with current traffic for the one or more third devices.

Aspect 14: The method of any of aspects 12 through 13, further comprising: outputting one or more messages to the second device triggering generation of the first BSR by the second device.

Aspect 15: The method of any of aspects 12 through 14, the obtaining comprising: obtaining, within the first BSR, an indication of a first average arrival time associated with the expected traffic for one or more third devices of a first type and a second average arrival time associated with the expected traffic for one or more third devices of a second type.

Aspect 16: The method of any of aspects 12 through 15, the obtaining comprising: obtaining, within the first BSR, an indication of an average arrival time associated with the expected traffic for the one or more third devices, wherein the one or more third devices is of a first type or a second type.

Aspect 17: The method of any of aspects 12 through 16, the obtaining comprising: obtaining, within the first BSR, an indication of a minimum arrival time associated with the expected traffic for the one or more third devices.

Aspect 18: The method of any of aspects 12 through 17, the obtaining comprising: obtaining, within the first BSR, an indication of a priority associated with each of the one or more third devices.

Aspect 19: The method of any of aspects 12 through 18, the activating comprising: activating the sleep mode for the one or more components associated with the first device based at least in part on obtaining the BSR message at a time determined based at least in part on the one or more arrival times.

Aspect 20: An apparatus comprising a processor; and memory coupled with the processor, the processor configured to perform a method of any of aspects 1 through 11.

Aspect 21: An apparatus comprising at least one means for performing a method of any of aspects 1 through 11.

Aspect 22: A non-transitory computer-readable medium storing code the code comprising instructions executable by a processor to perform a method of any of aspects 1 through 11.

Aspect 23: An apparatus for wireless communication at a first device in a wireless network, comprising a processor; and memory coupled with the processor, the processor configured to perform a method of any of aspects 12 through 19.

Aspect 24: An apparatus for wireless communication at a first device in a wireless network, comprising at least one means for performing a method of any of aspects 12 through 19.

Aspect 25: A non-transitory computer-readable medium storing code for wireless communication at a first device in a wireless network, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first device for wireless communication in a wireless network, comprising:
one or more memories storing processor-executable code; and
one or more processors coupled with the one or more memories and individually or collectively operable to execute the code to cause the first device to:

obtain one or more messages from one or more second devices different than, and in communication with, the first device, the one or more messages triggering generation of a first buffer status report by the first device; and
output a buffer status report message comprising the first buffer status report and a second buffer status report, the first buffer status report and the second buffer status report both associated with the one or more second devices different than the first device, the first buffer status report activating a sleep mode at a third device in communication with the first device, the first buffer status report indicating one or more arrival times associated with expected traffic for the one or more second devices in communication with the first device based at least in part on the one or more messages, and the second buffer status report indicating one or more arrival times associated with current traffic for the one or more second devices, wherein activating the sleep mode at the third device is based at least in part on the one or more arrival times indicated in the first buffer status report and the second buffer status report.

2. The first device of claim 1, wherein a first set of one or more bits of the buffer status report message is used for the first buffer status report and a second set of one or more bits of the buffer status report message is used for the second buffer status report.

3. The first device of claim 1, wherein, to obtain the one or more messages, the one or more processors are individually or collectively operable to execute the code to cause the first device to:
obtain the one or more messages from the one or more second devices, the one or more messages comprising one or more second buffer status reports triggering the generation of the first buffer status report by the first device.

4. The first device of claim 1, wherein, to obtain the one or more messages, the one or more processors are individually or collectively operable to execute the code to cause the first device to:
obtain the one or more messages indicating a periodicity for generating the first buffer status report, wherein the buffer status report message is output according to the periodicity.

5. The first device of claim 1, wherein, to obtain the one or more messages, the one or more processors are individually or collectively operable to execute the code to cause the first device to:
obtain the one or more messages from a parent device of the first device, the one or more messages triggering the generation of the first buffer status report by the first device, wherein the one or more second devices includes the parent device.

6. The first device of claim 1, wherein, to obtain the one or more messages, the one or more processors are individually or collectively operable to execute the code to cause the first device to:
obtain, via the one or more messages from the one or more second devices, an indication that a sleep mode for one or more components associated with the one or more second devices has been activated, the indication triggering the generation of the first buffer status report by the first device.

7. The first device of claim 1, wherein the one or more processors are individually or collectively further operable to execute the code to cause the first device to:
provide, for including within the first buffer status report, an indication of a first average arrival time associated with expected traffic for the one or more second devices having a first type and a second average arrival time associated with the expected traffic for the one or more second devices having a second type.

8. The first device of claim 1, wherein the one or more processors are individually or collectively further operable to execute the code to cause the first device to:
provide, for including within the first buffer status report, an indication of an average arrival time associated with the expected traffic for the one or more second devices, wherein the one or more second devices has a first type or a second type.

9. The first device of claim 1, wherein the one or more processors are individually or collectively further operable to execute the code to cause the first device to:
provide, for including within the first buffer status report, an indication of a minimum arrival time associated with the expected traffic for the one or more second devices.

10. The first device of claim 1, wherein the one or more processors are individually or collectively further operable to execute the code to cause the first device to:
provide, for including within the first buffer status report, an indication of a priority associated with each of the one or more second devices.

11. The first device of claim 1, wherein, to output the buffer status report message, the one or more processors are individually or collectively operable to execute the code to cause the first device to:
output the buffer status report message at a time determined based at least in part on the one or more arrival times.

12. A first device for wireless communication in a wireless network, comprising:
one or more memories storing processor-executable code; and
one or more processors coupled with the one or more memories and individually or collectively operable to execute the code to cause the first device to:
obtain a buffer status report message comprising a first buffer status report and a second buffer status report from a second device in response to the second device receiving one or more messages from one or more third devices triggering the buffer status report message, the first buffer status report and the second buffer status report both associated with the one or more third devices different than, and in communication with, the second device, the first buffer status report indicating one or more arrival times associated with expected traffic for the one or more third devices, and the second buffer status report indicating one or more arrival times associated with current traffic for the one or more third devices; and
activate a sleep mode for one or more components associated with the first device based at least in part on the one or more arrival times indicated in the first buffer status report and the second buffer status report, wherein the buffer status report message activates the sleep mode at the first device.

13. The first device of claim 12, wherein a first set of one or more bits of the buffer status report message are used for the first buffer status report and a second set of one or more bits of the buffer status report message are used for the second buffer status report.

14. The first device of claim 12, wherein the one or more processors are individually or collectively further operable to execute the code to cause the first device to:
output one or more second messages to the second device, the one or more second messages triggering generation of the first buffer status report by the second device.

15. The first device of claim 12, wherein, to obtain the buffer status report message, the one or more processors are individually or collectively operable to execute the code to cause the first device to:
obtain, within the first buffer status report, an indication of a first average arrival time associated with the expected traffic for the one or more third devices having a first type and a second average arrival time associated with the expected traffic for the one or more third devices having a second type.

16. The first device of claim 12, wherein, to obtain the buffer status report message, the one or more processors are individually or collectively operable to execute the code to cause the first device to:
obtain, within the first buffer status report, an indication of an average arrival time associated with the expected traffic for the one or more third devices, wherein the one or more third devices has a first type or a second type.

17. The first device of claim 12, wherein, to obtain the buffer status report message, the one or more processors are individually or collectively operable to execute the code to cause the first device to:
obtain, within the first buffer status report, an indication of a minimum arrival time associated with the expected traffic for the one or more third devices.

18. The first device of claim 12, wherein, to obtain the buffer status report message, the one or more processors are individually or collectively operable to execute the code to cause the first device to:
obtain, within the first buffer status report, an indication of a priority associated with each of the one or more third devices.

19. The first device of claim 12, wherein, to activate the sleep mode, the one or more processors are individually or collectively operable to execute the code to cause the first device to:
activate the sleep mode for the one or more components associated with the first device based at least in part on obtainment of the buffer status report message at a time determined based at least in part on the one or more arrival times.

20. A method for wireless communication at a first device comprising:
obtaining one or more messages from one or more second devices different than, and in communication with, the first device for activating a sleep mode at a third device in communication with the first device, the one or more messages triggering generation of a first buffer status report by the first device; and
outputting a buffer status report message comprising the first buffer status report and a second buffer status report, the first buffer status report and the second buffer status report both associated with the one or more second devices different than the first device, the first buffer status report activating the sleep mode at the third device, the first buffer status report indicating one or more arrival times associated with expected traffic for the one or more second devices in communication with the first device based at least in part on the one or more messages, and the second buffer status report indicating one or more arrival times associated with current traffic for the one or more second devices, wherein activating the sleep mode at the third device is based at least in part on the one or more arrival times indicated in the first buffer status report and the second buffer status report.

21. The method of claim 20, wherein a first set of one or more bits of the buffer status report message is used for the first buffer status report and a second set of one or more bits of the buffer status report message is used for the second buffer status report, the second buffer status report indicating one or more arrival times associated with current traffic for the one or more second devices.

22. The method of claim 20, the obtaining comprising:
obtaining the one or more messages from the one or more second devices, the one or more messages comprising one or more second buffer status reports triggering the generation of the first buffer status report by the first device.

23. The method of claim 20, the obtaining comprising:
obtaining the one or more messages indicating a periodicity for generating the first buffer status report, wherein the buffer status report message is output according to the periodicity.

24. The method of claim 20, the obtaining comprising:
obtaining the one or more messages from a parent device of the first device, the one or more messages triggering the generation of the first buffer status report by the first device, wherein the one or more second devices includes the parent device.

25. The method of claim 20, the obtaining comprising:
obtaining, via the one or more messages from the one or more second devices, an indication that a sleep mode for one or more components associated with the one or more second devices has been activated, the indication triggering the generation of the first buffer status report by the first device.

26. The method of claim 20, further comprising:
providing, for including within the first buffer status report, an indication of a first average arrival time associated with expected traffic for the one or more second devices having a first type and a second average arrival time associated with the expected traffic for the one or more second devices having a second type.

27. A method for wireless communication at a first device in a wireless network, comprising:
obtaining a buffer status report message comprising a first buffer status report and a second buffer status report from a second device in response to the second device receiving one or more messages from one or more third devices triggering the buffer status report message, the first buffer status report and the second buffer status report both associated with the one or more third devices different than, and in communication with, the second device, the first buffer status report indicating one or more arrival times associated with expected traffic for the one or more third devices, and the second buffer status report indicating one or more arrival times associated with current traffic for the one or more third devices; and
activating a sleep mode for one or more components associated with the first device based at least in part on the one or more arrival times indicated in the first buffer status report and the second buffer status report, wherein the buffer status report message activates the sleep mode at the first device.

28. The method of claim 27, wherein a first set of one or more bits of the buffer status report message are used for the first buffer status report and a second set of one or more bits of the buffer status report message are used for the second buffer status report, the second buffer status report indicating one or more arrival times associated with current traffic for the one or more third devices.

29. The method of claim 27, further comprising:
   outputting one or more second messages to the second device, the one or more second messages triggering generation of the first buffer status report by the second device.

30. The method of claim 27, the obtaining comprising:
   obtaining, within the first buffer status report, an indication of a first average arrival time associated with the expected traffic for the one or more third devices having a first type and a second average arrival time associated with the expected traffic for the one or more third devices having a second type.

* * * * *